(12) United States Patent
Krishnaswamy et al.

(10) Patent No.: US 10,360,732 B2
(45) Date of Patent: Jul. 23, 2019

(54) METHOD AND SYSTEM OF DETERMINING OBJECT POSITIONS FOR IMAGE PROCESSING USING WIRELESS NETWORK ANGLE OF TRANSMISSION

(71) Applicant: Intel Corporation, Santa Clara, CA (US)

(72) Inventors: Prasanna Krishnaswamy, Bangalore (IN); Himanshu Bhalla, Bengaluru (IN); Chetan Verma, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/467,869

(22) Filed: Mar. 23, 2017

(65) Prior Publication Data

US 2018/0276841 A1    Sep. 27, 2018

(51) Int. Cl.
| | |
|---|---|
| *G06K 9/00* | (2006.01) |
| *G06T 19/00* | (2011.01) |
| *H04N 7/18* | (2006.01) |
| *G06T 7/11* | (2017.01) |
| *G06T 7/162* | (2017.01) |
| *G06T 7/194* | (2017.01) |
| *G06K 9/32* | (2006.01) |
| *G06K 9/62* | (2006.01) |
| *G08B 13/196* | (2006.01) |

(52) U.S. Cl.
CPC ........ *G06T 19/006* (2013.01); *G06K 9/00671* (2013.01); *G06K 9/3233* (2013.01); *G06K 9/6271* (2013.01); *G06T 7/11* (2017.01); *G06T 7/162* (2017.01); *G06T 7/194* (2017.01); *H04N 7/185* (2013.01); *G06T 2200/04* (2013.01); *G06T 2207/10024* (2013.01); *G06T 2207/10028* (2013.01); *G08B 13/19617* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 9,741,125 B2 | 8/2017 | Baruch et al. | |
| 2015/0324686 A1* | 11/2015 | Julian | G06N 3/08 |
| | | | 706/25 |
| 2015/0371104 A1* | 12/2015 | Fung | G06K 9/46 |
| | | | 348/50 |
| 2016/0179198 A1* | 6/2016 | Levesque | G06F 3/016 |
| | | | 340/407.1 |
| 2017/0064667 A1* | 3/2017 | Mycek | H04B 17/318 |
| 2017/0316081 A1* | 11/2017 | Kafai | G06F 17/30598 |

OTHER PUBLICATIONS 1484.12.1TM IEEE Standard for Learning Object Metadata; retrieved online via http://ieeeplore.ieee.org/document/1032843; 2002.

(Continued)

*Primary Examiner* — Stephen P Coleman
(74) *Attorney, Agent, or Firm* — Green, Howard & Mughal LLP.

(57) ABSTRACT

Techniques related to a system, article, and method of determining object positions for image processing using wireless network angle of transmission.

25 Claims, 11 Drawing Sheets

(56) References Cited

OTHER PUBLICATIONS

OpenCV; "Structural Analysis and Shape Descriptors"; retrieved online via www.docs.opencv.org/2.4/modules/imgproc/doc/structural_analysis_and_shape_descriptors.html.
Wikipedia; "Parallel Curve"; 6 pages; retrieved online via www.en.wikipedia.org/wiki/Parallel curve.
Gunther et al.; "Measuring Round Trip Times to Determine the Distance between WLAN Nodes"; TKN Technical Report TKN-04-16; Technical University, Berlin; pp. 1-41; retrieved onling via www.net.in.tum.de/fileadmin/bibtex/publications/papers/tkn_04_16_paper3.pdf.
Bluetooth; "Bluetooth Core Specification"; v5.0; vol. 0; Part B; retrieved online via www.specworkspace.bluetooth.com/specifications.
Sallem et al., "Extended GrabCut for 3D and RGB-D Point Clouds", Proceedings at Advanced Concepts for Intelligent Vision Systems, 15th International Conference; 2013.
Hickson, Steven et al., "Efficient Hierarchical Graph-Based Segmentation of RGBD Videos", in proceedings of 26th IEEE Conference on Computer Vision and Pattern Recognition (CVPR), Columbus, OH, USA, Jun. 2014.
Mille, "Parameterized Narrow Band Active Contour", Universite' Francois Rabelais de Tours, Laboratoire Informatique (EA2101); http://liris.cnrs.fr/documents/liris-4476.pdf.
Suzuki, et al., "Topological Structual Analysis of Digitzed Binary Images by Border Following", CVGIP 30 1, pp. 32-46; 1985.

\* cited by examiner

FIG. 3 300

OBTAIN IMAGE DATA OF AT LEAST ONE IMAGE OF A VIDEO SEQUENCE AND COMPRISING AT LEAST ONE OBJECT REGION THAT IS A PICTURE OF AN OBJECT AND TO BE SEGMENTED FROM OTHER AREAS ON THE AT LEAST ONE IMAGE OR IDENTIFIED OR BOTH 302

DETERMINE A DISTANCE ALONG AN ANGLE OF TRANSMISSION BETWEEN A WIRELESS NETWORK FIRST UNIT ON AN IMAGE CAPTURE DEVICE CAPTURING THE AT LEAST ONE IMAGE AND A WIRELESS NETWORK SECOND UNIT ON THE OBJECT 304

CALCULATE COMPONENTS OF THE DISTANCE AND THAT ARE PARALLEL TO A PLANE FACING THE OPTICAL DIRECTION OF THE IMAGE CAPTURE DEVICE 306

USE THE COMPONENTS TO DETERMINE THE POSITION OF THE OBJECT REGION ON THE IMAGE 308

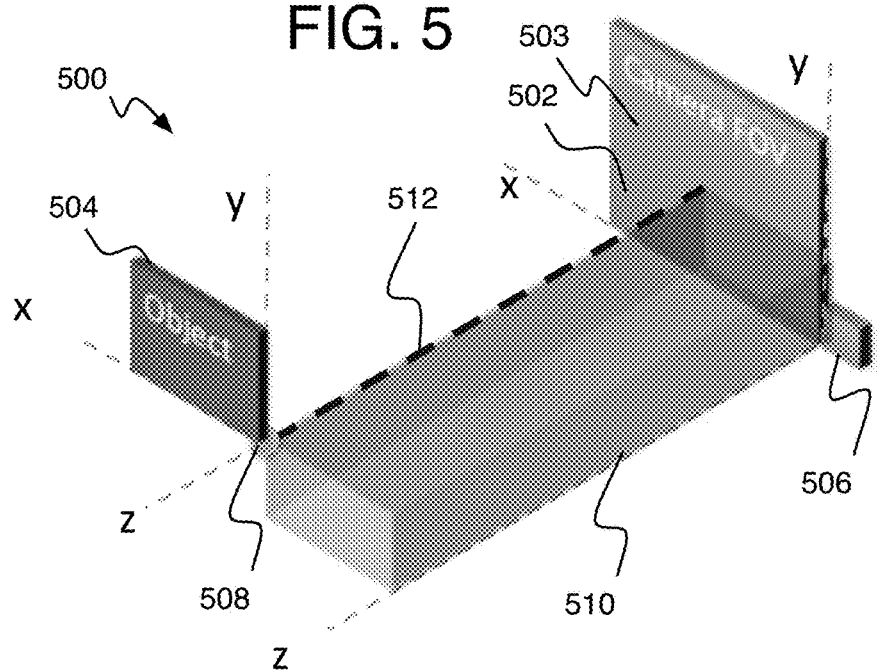

FIG. 5

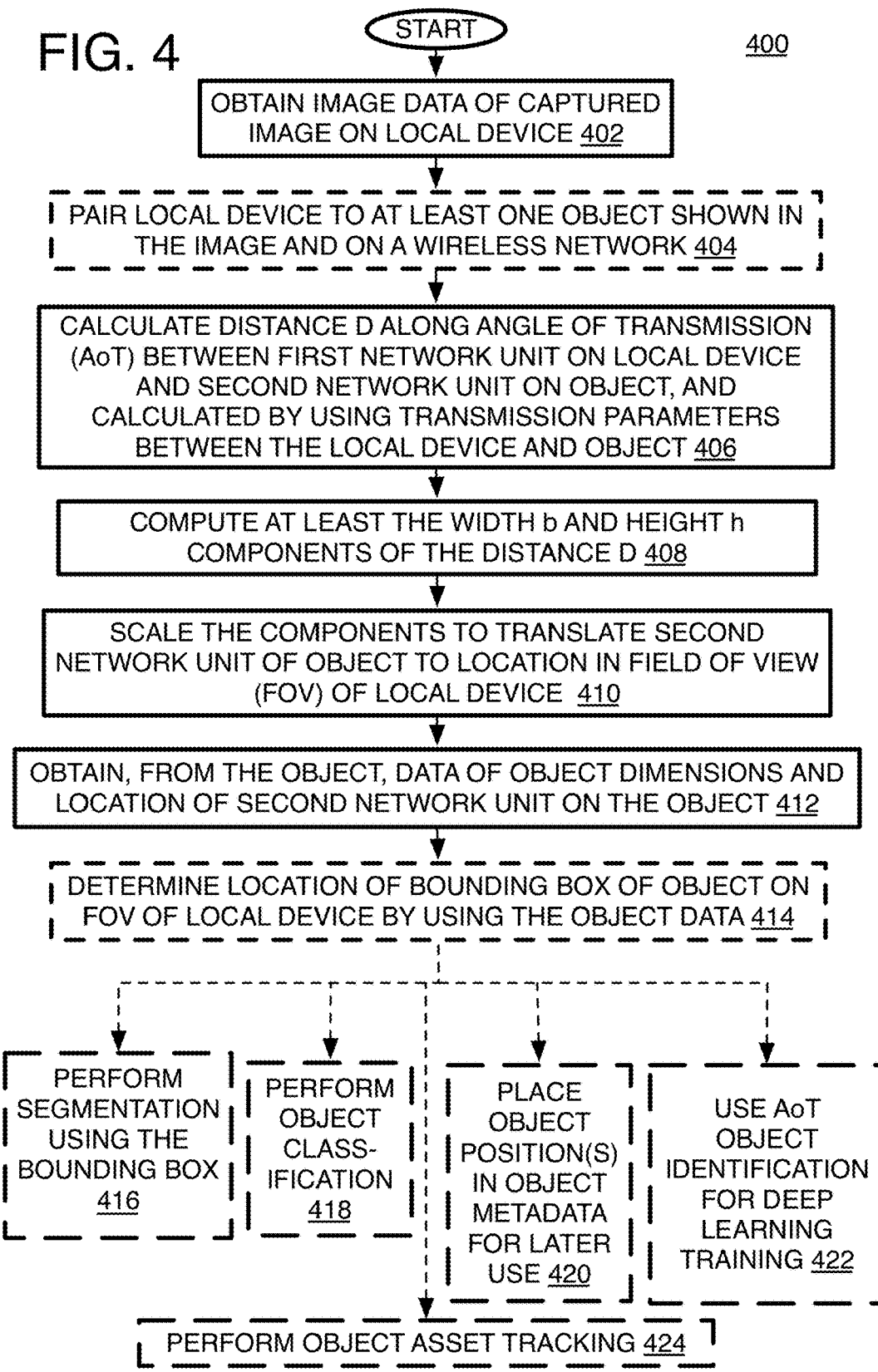

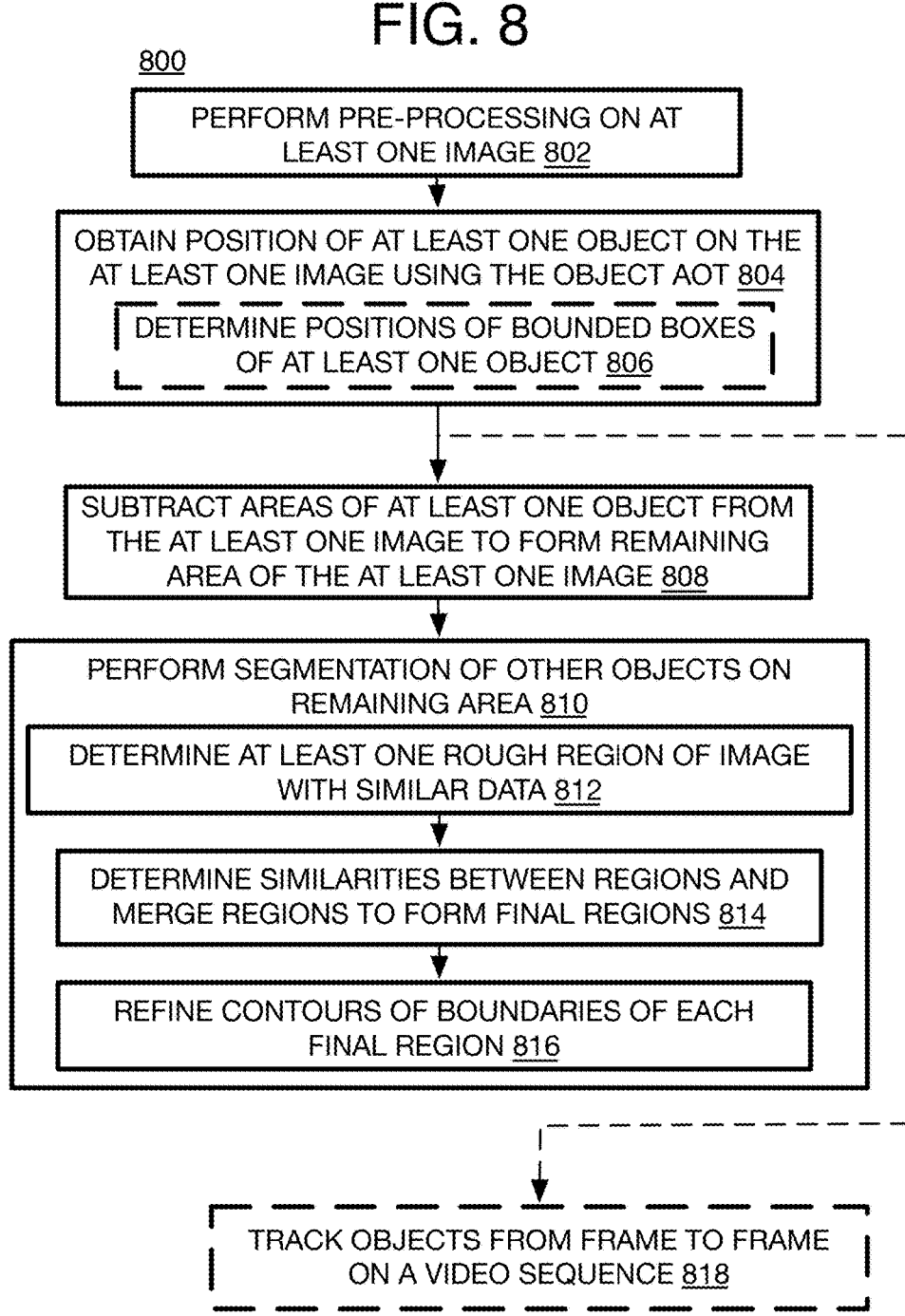

PERFORM PRE-PROCESSING ON AT LEAST ONE IMAGE 902

↓

PERFORM OBJECT REGION PROPOSAL GENERATION TO DETERMINE CANDIDATE REGIONS OF INTEREST (ROIs) 904

DETERMINE POSITIONS OF BOUNDED BOXES OF AT LEAST ONE OBJECT WITH WIRELESS NETWORK UNIT USING THE AOT OF THE UNIT 906

DETERMINE POSITION OF OTHER OBJECTS IN IMAGE WITHOUT A WIRELESS NETWORK UNIT 908

↓

CLASSIFY THE OBJECTS USING ROIs IN MACHINE LEARNING CLASSIFIER 910

↓

STORE OBJECT CLASS DATA OF OBJECT IN METADATA OF WIRELESS NETWORK UNIT OF OBJECT, AND FOR INDIVIDUAL OR EACH OBJECT 912

↓

STORE OBJECT CLASS DATA AND POSITION DATA OF MULTIPLE OBJECTS IN METADATA OF WIRELESS NETWORK UNIT OF OBJECT, AND FOR INDIVIDUAL OR EACH OBJECT 914

↓

PERFORM SEGMENTATION BY USING THE OBJECT POSITIONS 916

↓

PERFORM OBJECT DETECTION BY USING THE OBJECT CLASS DATA 918

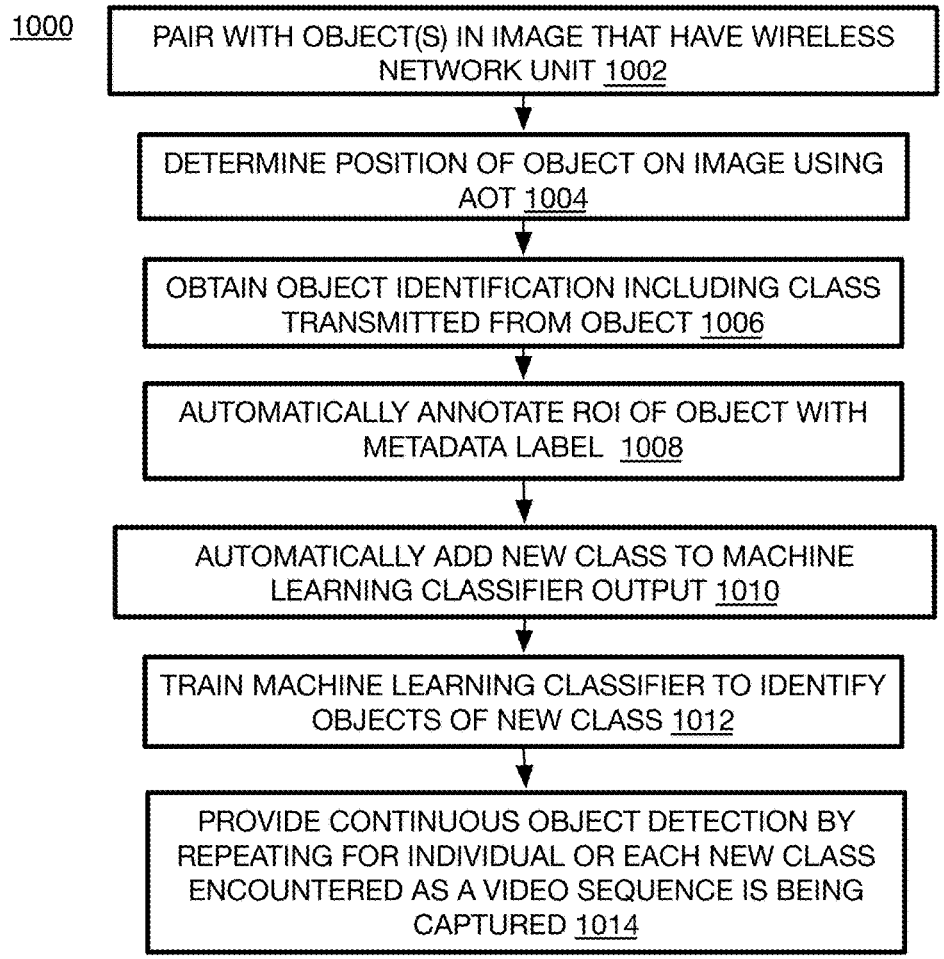

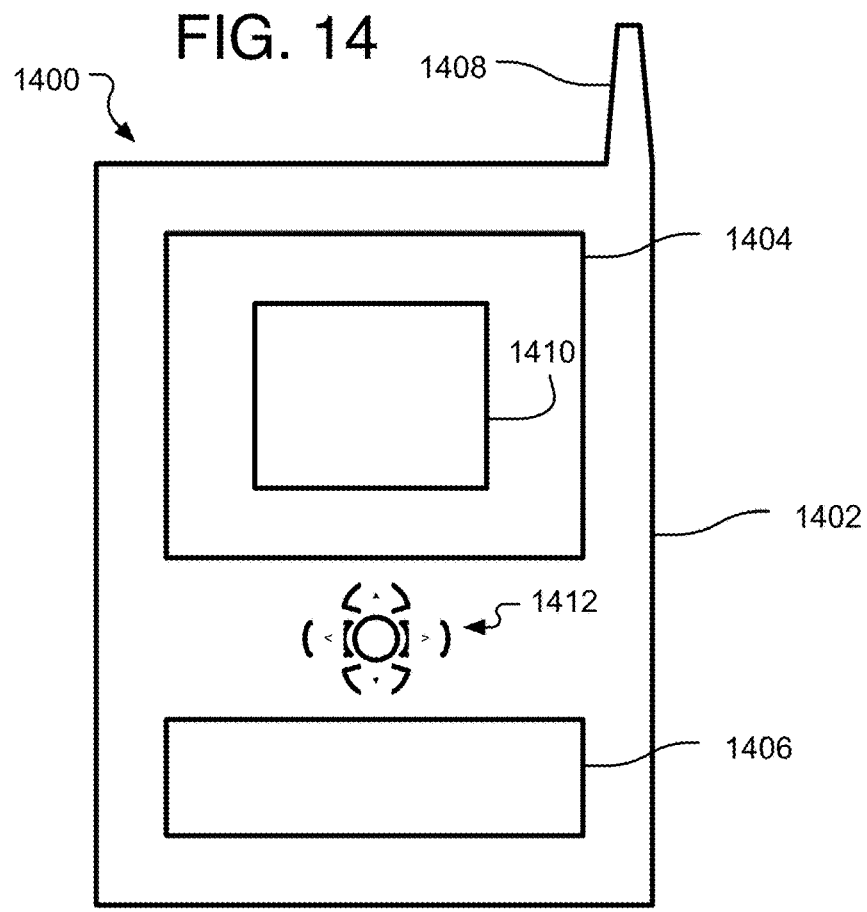
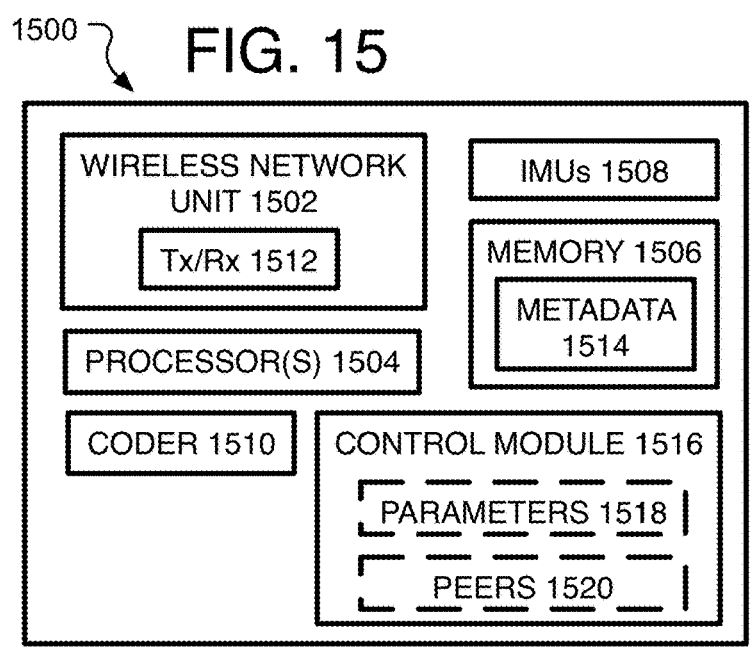

METHOD AND SYSTEM OF DETERMINING OBJECT POSITIONS FOR IMAGE PROCESSING USING WIRELESS NETWORK ANGLE OF TRANSMISSION

BACKGROUND

When an image or scene is captured on a camera or provided on some other electronic device or computer as a digital image, it can be desirable to segment objects in the image from each other and a background in the image. This may be performed to change the appearance of the image by augmenting the objects and/or background whether for artistic purposes, entertainment, or practical reasons, such as to use color pop that highlights a foreground object by displaying the foreground in color while showing the background in black and white. Segmentation also may be performed for operational reasons so that a user can select an object with a cursor to activate some action or move the object. Segmentation also may be performed where determining the shape of an object is important as with medical imaging. Otherwise, segmentation may be used as a tool for a number of downstream image or vision processing tasks such as encoding efficiency where less detail is compressed for a background of an image versus the foreground, or pattern recognition and/or clustering of data for further image processing tasks. This may include using the segmentation as a tool for object detection. Object detection is used to identify objects in the scene so that what the object is, for example a television or a chair, is understood. The object detection is performed so that some action can be performed depending on the identification of the object, such as with mixed or augmented reality electronic games, artificial intelligence (AI) systems, or any other application that operates the identified object or is used to modify the appearance of the identified object on the captured image depending on the identity of the object.

The segmentation often includes finding regions on the image with similar colors or patterns determined by examining color or luminance gradations of the pixel data. The object detection then attempts to classify these regions of interest (ROIs). For both segmentation and object identification, these operations can be relatively slow, causing delay and often have an insufficient accuracy resulting in a less than desirable user experience. This is particularly true in real-time image applications such as mixed reality (MR) where virtual objects are placed into a view of the real world, or augmented reality (AR) applications where objects in real world views are modified or warped.

In addition, object detection uses machine learning methods, and one example of such a method uses deep neural networks (DNNs) to classify the ROIs in images inputted to the DNN. This often involves use of cumbersome training techniques that require manual identification of objects in the images, by drawing a bounding box around the object in the image, and where the programmer must label the objects being identified (television, DVD player, etc.) by manually annotating the ROI image. Thus, such training cannot be performed during the run-time of the object detection system so that the object detection cannot be adaptable to newly encountered objects in an image during run-time. Object detection using a DNN also may be limited to the quality of the dataset available and its variance. DNNs typically often fail for corner cases (multiple simultaneous extreme variable levels) that the network has not learned before.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart showing a method of determining object positions for image processing using a wireless network angle of transmission according to the implementations herein;

FIG. 4 is a detailed flow chart of a method of determining object positions for image processing using a wireless network angle of transmission according to the implementations herein;

FIG. 5 is a schematic diagram to show the arrangement of a local device relative to an object according to the implementations herein;

FIG. 8 is a flow chart of a method of segmentation according to the implementations described herein;

FIG. 9 is a flow chart of a method of object detection according to the implementations described herein;

FIG. 10 is a flow chart of a method of continuous learning machine training for object detection according to the implementations described herein;

FIG. 14 illustrates another example device, all arranged in accordance with at least some implementations of the present disclosure; and FIG. 15 is an illustrative diagram of an example system.

DETAILED DESCRIPTION

Figure 1:
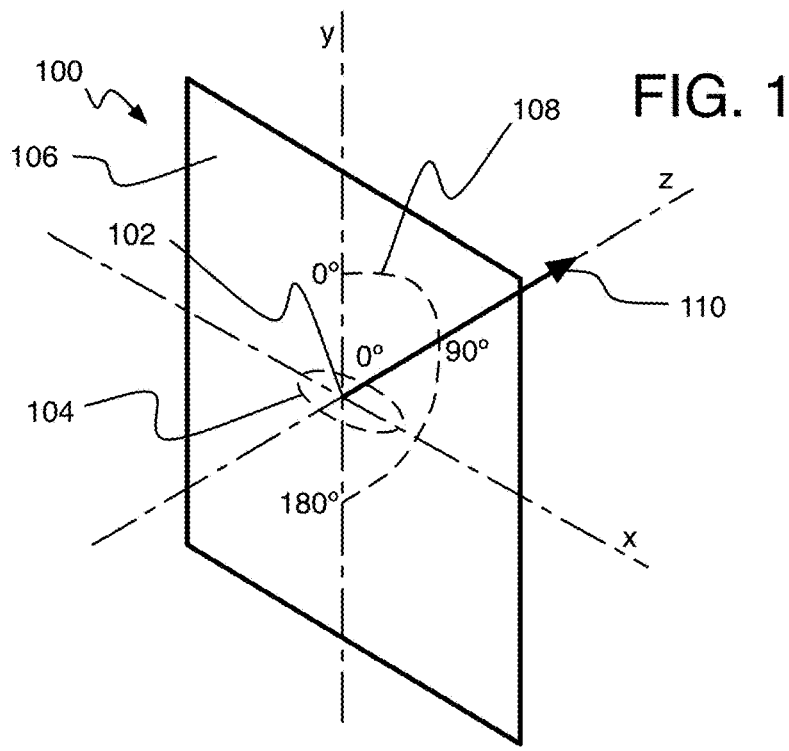
FIG. 1 is a schematic diagram to explain angle of transmission as used in accordance with the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, TV remotes or other remote controllers, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof consistent with the threads when used as described herein.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of determining object positions for image processing using wireless network angle of transmission.

As mentioned, it is desirable to segment and detect objects in an image such as on a field of view (FOV) on a screen of an image capture device (or camera). The segmentation and object detection can have significant delays and inaccuracies due to the reliance on defining objects by pixel data analysis of the colors and luminance values forming the image alone. Conventionally during segmentation, filters are applied to form rough regions in the image where each region has similar pixel data, such as similar color, grayscale (luma) value, patterns, material, and/or texture of regions on the image, and so forth. Connected component analysis then may be applied that merges similar rough regions. To finalize the shape of the regions (or objects), complicated contour shaping algorithms may be applied to boundaries of the regions such as graph-cut or energy algorithms such as active contour. Performing these algorithms over thousands or even millions of pixels can result in delay sufficiently significant to be noticeable to a user. Inaccuracies can result when the system will not wait for delayed processing and skips computations for some areas of an image. Also, the algorithms can have errors when the colors and/or lighting cause display of images difficult to segment such as repeating patterns of dark and light colors on a single object, shadows falling across objects, and so forth. It should be noted that the term "image" is used interchangeably herein with the terms picture or frame.

Object detection is conventionally performed by using the region on an image that was defined as an object by the segmentation as a proposed region of interest (ROI) image input to an object detection machine learning classifier, which may be a deep learning machine such as a deep neural network (DNN), or specifically, a convolutional neural network (CNN). The ROI may have a bounding box around an object in an image. The CNN may have a number of layers, each with weights that are applied to values representing the input image as the image data is propagated through the CNN layers from an input layer until an output layer. The output of the CNN is a score indicating a normalized confidence of a classification label, and this score may be provided for each available class of the CNN. The largest confidence label indicates the most likely label for the object as classified by the CNN. Thus, it will be understood that the object detection also heavily relies on the pixel data analysis of the segmentation such that the delays and inaccuracies can be maintained and expanded by the performing the object detection. These deep learning based object detection techniques have significant problems with differentiating between objects that look similar in shape or color for example, and with many different machine learning and DNN based systems. These systems also can take anywhere from a relatively slow tens to hundreds of milliseconds to classify one single image in a video sequence being processed at 30 fps for example.

Training of the machine learning classifier may occur before deployment of the object detection system, or offline for subsequent updating of the system. Typically, a portion of a dataset of images each with an object is generated by recording a video for example, and about half of the frames are reserved for training. The programmer manually draws (or more particularly, defines on an image) a bounding box around a known object region (or ROI) on an image. The programmer than manually annotates the ROI, or bounding box, with a label of the object, such as television, chair, table, and so forth. In order to be affective in training the classifier, initially this may be required for thousands or even millions of objects. The annotated ROIs are then input to the CNN one at a time while the label (or class) of the ROI being trained is placed at the output along with the other classes. The CNN is then trained to learn both the ROI and a label for each ROI of the annotated dataset. It does so by learning the weights for different layers of the network by minimizing errors during multiple forward and backward passes through the network, until it reaches a convergence threshold with minimum error. Due to the required manual annotation, the training cannot occur during run-time as new objects are being encountered during a MR or AR reality run-time session for example and that are not already classified by the object detection system. This limits which objects can be used by a user during the run-time session, significantly limiting the user experience.

To resolve these issues, the present method of object detection and segmentation uses the angle of transmission in a short-range wireless data transmission network in order to determine object positions within the field of view (FOV) or image of an image capture device (or camera) also referred to as a local or control device. A number of electronic devices that have image-based features including segmentation and object detection also have short-range wireless transmission capability such as with a Bluetooth® (BT) network to receive data from a peer or object with a wireless network (or BT) chip (or other network transceiver structure) referred to herein as a wireless network unit. Bluetooth® is known to have an angle of arrival (AoA) and angle of departure (AoD) that respectively indicates both an angular direction to or from a network point (which may be a transmitter or receiver or transceiver device). The transmissions define a linear direction (whether arriving or departing from the point). The AoA and AoD are both generally referred to herein as an angle of transmission (AoT) without regard to the linear direction, so that it does not matter whether a transmission is arriving at, or departing from, such a point.

The angular direction of the transmission can be used by measuring the distance of the transmission along the angle of transmission, and once the distance of the transmission is determined, the components of the transmission can be determined to determine the real world position of the peer device (object) relative to the local device so that the object can be correctly position on the FOV of the screen of the local device. The peer device also may transmit object identification or other data to the local device. With both the position and the identification of the object, segmentation and object detection can become quite efficient, and such a system can provide a number of different features. Since obtaining the segmentation and object detection of objects with wireless network capability eliminates (or reduces) the need to analyze the pixel data of these objects to accomplish the segmentation, the use of a wireless network angle of transmission can improve speed and accuracy of object detection and segmentation in images, and by one example, in MR and AR scenarios in gaming and command/control usages. These methods also may reduce the power consumption to perform segmentation and object detection tasks providing more power for other tasks or longer battery life for the local device providing these features.

More specifically, the distance of a transmission along a direction (or AoT) of a signal from a peer device to a local or control device can be measured by using a received signal strength indicator (RSSI), which is a reference transmission power or signal level, and the Tx power, which is a measurement of the actual power or signal level present in a received radio signal. These power levels are typically provided on short-range wireless networks such as BT 5, and a sample calculation is provided below. The distance measurement performed with the Tx power and RSSI may lead to very accurate position and identification of a peer wireless device in physical space. The details are explained below.

Once the distance is calculated, the components of the distance can be determined, and by using trigonometric equations that provide components parallel to the plane of the FOV. The components can then be scaled and the object region (which is a picture of the object) orientated to be placed accurately in the FOV and in the correct perspective of the FOV. This is performed with pixel accuracy at its boundaries so that further segmentation operations for the object region are not needed. The accurately positioned object region can then be used as an input for more efficient and more accurate object detection that identifies the class of the object for the system being used.

In addition to the increase in efficiency and accuracy or the segmentation and object detection, such a system that uses objects with wireless network capability also may provide continuous training and updating for the machine learning classifier used to perform the object detection. Since objects with wireless network capability, such as with a BT network unit, can transmit their object identification to a local device performing object detection, even when it is a new type or class of object that has not been encountered before by the object detection system, the local device can skip the manual identification and annotation of an ROI by using the object identification data as an automatic annotation transmitted from the object, and for an input ROI. This enables continuous training of the machine learning classifier to update the classifier as new objects are encountered by the local device. This significantly improves the capabilities of the applications that rely on the object detection by significantly expanding the number of different types of objects that can be detected by the system, and provides real-time (or close to real-time) updating of the system.

The use of the wireless network also provides the opportunity to increase efficiency in other ways. The use of the angle of transmission between the local device and individual objects permits a system to determine the position and identification of each of these multiple objects in an image (or scene or FOV). The detected objects are subtracted from the scene, or a mask is used, and conventional segmentation is applied to the remaining areas of the scene. The more objects are positioned and identified, the more efficient is the system with less conventional segmentation. Since the segmentation provides the regions of interest (ROIs) for the object detection, this also increases the efficiency of the object detection.

The use of the wireless network also may increase efficiency by providing position and identification data of multiple objects simply by receiving the data of a single object. More specifically, metadata of the position of a peer object relative to other nearby objects as well as the identification of the object and its nearby objects may be stored at a memory of one or more of the objects with a wireless network unit. Thus, while moving a local device and as objects come into the FOV of the local device, the object may transmit the metadata of multiple nearby objects in addition to its own position and identification data so that the segmentation and object detection computations are greatly reduced.

These methods also may permit features in command and control implementations. For example, a user may be able to touch objects, such as a television, on the FOV of a tablet, camera, or smartphone, or uses gestures, or points, such a local device toward the object, and a menu may pop up to control the object contextually.

With these methods, devices can now exchange metadata amongst themselves based on their location in a scene built via the segmentation methods herein. Thus, when a local device identifies and determines the position of multiple wireless network objects, the objects may be controlled to form a group effect. For example, a television could identify and obtain information from wireless network enabled lights in its vicinity regarding their relative positions in 3D space, their location vis-à-vis other light sources in the vicinity obtained via object detection, and their capabilities. Then, based on the television format, parameters, and the images being displayed, the television could control the lights to provide an optimal viewing environment, such as to customize the glare reduction algorithm to reduce glare from the lights. Many other environmental factors could be controlled in this way.

Regarding the AR and MR scenarios, segmentation also can be used for multi-player scenarios where objects from one view point of one local device of one user are interspersed into another viewpoint of another local device of another user.

In the real world, the methods also could be used to track moving objects in smart building devices. For example, a wheelchair equipped with a wireless network unit can be tracked to feed into action recognition or other higher level modalities enabling home safety.

Otherwise, generally, the methods could be used to track object regions from frame to frame in a video sequence. Other details are provided below.

Otherwise, the methods herein could be used with immersive shopping systems for example where segmentation in a view finder can be used to enhance a shopping experience. For example, pointing a local device so that a sofa at a store in the real world and equipped with a wireless network unit can be accurately segmented and visualized with image modification operations such as to modify the sofa with different colors and/or textures. Many other examples are possible.

Referring to FIG. 1, a diagram 100 is provided to explain the angle of transmission herein, particularly referred to as an Angle of Arrival (AoA). The measurement may be different depending on the implementation. Here, however, in order to identify the direction of a signal originating from a peer device, it can be described in two angles. The direction (represented by the arrow) 110 of the signal may originate from the peer device or point 102 that is a wireless network unit on an object or peer device. The point 102 lies on a plane 106 that faces the transmission direction 110. A first angle is horizontal (0-360 degrees) as shown by the dashed line 104. In this case, the direction 110 is 0 degrees in a z direction so that the plane 106 includes axes x and y. The second angle is vertical (0-180 degrees) as shown by the dashed line 108 and orthogonal to the plane 106 here set at 90 degrees. Therefore, the line of sight angle here in this example is (0, 90). More information can be found in the BT 5 specification as mentioned above.

Figure 2:
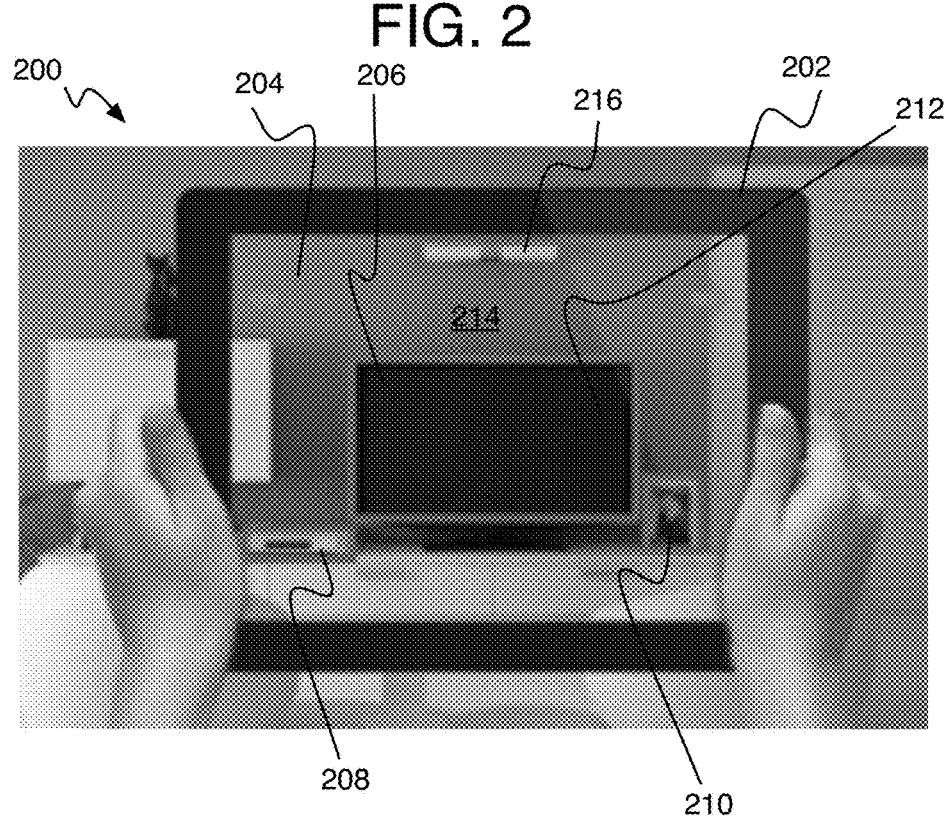
FIG. 2 is an image of a local image capture device providing an image of peer objects according to the implementations herein.

Referring to FIG. 2, an image of a local or control device (here a tablet) 200 is shown displaying a scene or image 204 on a screen 214 within a border 202 and that defines the field of view (FOV) of the local device 200. The image or picture shows an example of an indoor home environment and particularly an entertainment system with multiple BT based objects or peer devices. In this example, a wide screen TV 206 is near a DVD player 208, an electronic picture frame 210 that typically shows a slide show of pictures, and a speaker system 216. The methods and system herein may determine the position and identification of each of these objects. The result may be that each object is shown bordered by a bounding box, defined in pixel dimensions, defining the area on the image that forms the object the bounding box surrounds. For example, the TV 206 has a bounding box 212. In such a scenario, a bounding box can be created for each of the peer devices found in the camera field of view, based on the BT AOT, pose of the local device (or camera) 200, and the properties of the peer device such as physical XYZ dimensions of the device and the relative XYZ location of a wireless network unit (such as a BT chip by one example) on the peer device. This data may be stored as metadata on a memory of the wireless network unit itself or where the metadata is accessible to such a unit on the object. More details are provided below.

Referring to FIG. 3, a process 300 is provided for a method of determining object positions for image processing using wireless network angle of transmission. In the illustrated implementation, process 300 may include one or more operations, functions or actions 302 to 308 numbered evenly. By way of non-limiting example, process 300 may be described herein with reference to example image processing system 200 of FIG. 2, or system 1200 of FIG. 12, and where relevant.

Process 300 may include "obtaining image data of at least one image of a video sequence and comprising at least one object region that is a picture of an object and to be segmented from other areas on the at least one image or identified or both" 302. As explained below, this may include obtaining raw data of pixels as being recorded in a video sequence and in a color space (such as RGB, YUV, and so forth), and pre-processing raw image data sufficient for segmentation. The result may be obtaining color and/or luminance values per pixel for each frame, and also may include gradient maps, histograms, depth maps, and other image-based data. Also, the image data is obtained by a local or control device with a screen for close to real-time viewing of a scene. This may include a preview or main view screen on a dedicated camera, tablet, smartphone, or head mounted display (HMD) device that defines a FOV, for example. A handheld local device may be pointed toward objects shown in the FOV of the local device in order to command or control the objects, such as a TV. Otherwise, MR or AR HMD or controller devices, such as for gaming, entertainment, or other reasons, may be the local devices to form an interactive experience with the objects shown in the FOV. Many variations are possible, and are not particularly limited as long as objects with a wireless network unit, such as with short-range networks or a Bluetooth® network for example, can be viewed in the FOV of the local device for precise positioning of the object on the FOV. The term "object region" is used simply to differentiate between the picture of the object on an image and the real world, physical object.

Process 300 may include "determine a distance along an angle of transmission between a wireless network first unit on an image capture device capturing the at least one image and a wireless network second unit on the object" 304. Here, the local device and at least one peer device or object has first and second wireless network units, respectively, that can transmit data, in at least one direction, and in many cases, in both directions. By one form, the object transmits to establish a pairing to the local device, and thereafter may transmit other data to the local device. The transmission between the first and second units at the two devices can be considered to establish a linear transmission at an angle of transmission directly from one unit to the other. It should be understood that the transmission used to establish the angle of transmission does not necessarily need to be the transmission related to the image on the FOV or the identity or position of the object sending or receiving the transmission. Thus, the transmission could be sending unrelated data on the same wireless network, or a wireless network may be used to establish the distance that is different from the wireless network transmitting data of the position data or identity data of the object. For example, the distance and angle of transmission could be established on an audio data network or even an optical transfer technology network. Other details as to the type of wireless network that can be used are provided below.

It also will be understood that the network establishing the AoT and distance may be other than by BT alone, and can be performed by other technologies including light, sound, and so forth.

Process 300 then may include "calculate components of the distance and that are parallel to a plane facing the optical direction of the image capture device" 306. In other words, the components should be parallel to the plane forming the image or FOV of the image capture device (or the local device). The plane isn't necessarily substantially perpendicular to the optical direction, but in known cases it would be. The distance between the first and second units can be measured using the relationship between the RSSI reference power and the Tx actual power as described below. This is performed without the use of triangulation which requires at least a third wireless network unit or a multi-antenna system (with multiple linear transmission lines between the same two wireless network units), which can be omitted here. Once the distance is measured, it can be assumed that the wireless network first unit at the local device is in a plane that is parallel to a plane of the face of the object with the wireless network second unit thereby forming ends of a cuboid, and where the distance extends the length of the cuboid. The dimensions or components of the distance can then be computed using trigonometric formulas and as dimensions (width, height, and length) of the cuboid.

Process 300 then may include "use the components to determine the position of the object region on the image" 308. The width and height components of the distance extend orthogonal (including perpendicular by one example) to the optical direction, and therefore can also be considered to form coordinates of axes that extend in the two dimensions in the FOV or image of the local device. By one example, the components are x (width b) and y (height h) components that can be considered to extend in the x and y dimensions of the FOV. Once the real world (b, h) coordinates of the wireless network second unit are determined relative to the wireless network first unit, the (b, h) coordinates can be scaled to place the wireless network second unit on the correct anchor location of the object region on the FOV image. The dimensions and location of the second unit on the object relative to the dimensions of the object can be transmitted by the wireless network second unit as metadata or other transmission to the local device along with the global orientation of the object relative to gravity and the magnetic North and determined by gyroscope, accelerometer, digital compass (magnetometer), global position system (GPS) if available, and/or so forth, on the object. Since the orientation of the local device also may be known by using the same tools, it is possible to size and rotate the object into the correct perspective of the FOV thereby positioning the object on the FOV including a definition of the boundaries of the object. A 2D bounding box may be placed around the object in the FOV to define outer 2D dimensions of the object on the FOV as explained below. The object also may transmit object identification data including an initial label (TV, chair, etc.), object capabilities, control options or parameters, or other data needed to control the object. Other details are provided below.

Once the position of the object in the FOV is known and the object identity is obtained, segmentation of the entire image alone, or segmentation and object detection can be performed. This may include using the bounding box of each object as a single region or ROI. The ROIs with the bounding boxes from use of the AoT are already sufficiently defined and need no further segmentation. Whether a bounding box is used or not, the resulting dimensions of the object on the FOV can be to single pixel accuracy without performing the chroma and luma analysis of conventional segmentation on all parts of the object. The bounding boxes may be subtracted from the image, and conventional pixel data analysis segmentation may be performed on the remaining areas of an image that are not within a bounding box. All identified ROIs are then provided to a machine learning classifier for object detection that classifies each object for its final identification. Once object detection identifies the object, the object can be used in a number of different applications as already explained herein whether to modify the appearance of the object on the FOV screen of the local device, to select the object for some action, or to operate the object in the real world by changing parameters of the object from the local or other device. This all may be performed with significant efficiency including speed and accuracy as well as a reduction in power consumption by using the angle of transmission (AoT) instead of chroma and luma pixel data analysis for segmentation.

Also as mentioned, the AoT operations herein also enable continuous training of the machine learning classifier to train the classifier to identify new wireless network capable objects that are encountered for the first time as these objects are displayed in the FOV of the local device. This is enabled by the use of automatic annotation. More details of the training also are provided below.

Referring to FIG. 4, a process 400 is provided for a method of determining object positions for image processing using wireless network angle of transmission. In the illustrated implementation, process 400 may include one or more operations, functions or actions 402 to 424 numbered evenly. By way of non-limiting example, process 400 may be described herein with reference to example image processing system 200 of FIG. 2, or system 1200 of FIG. 12, and where relevant.

Process 400 may include "obtain image data of captured image on local device" 402. Preliminarily, this may include capturing images with an image capture device or video camera that provides a video sequence of images at 30 fps or other rate for example, and provides the images while, or in parallel to, the images being processed for display including the segmentation processing described herein. The images may be displayed on a field of view (FOV) or preview screen of a local or control device, or other screen for viewing a scene being recorded such as a tablet 200 (FIG. 2) with FOV 204 but also could be a view screen of an HMD or dedicated camera. Many variations are possible. This operation also may include obtaining the frames in the form of pre-processed raw image data with RGB chroma values in addition to luminance pixel values, or YUV, or other color space pixel values for individual images in the video sequence. The color and luminance values may be provided in many different additional forms such as gradients, histograms, and so forth. The pre-processing could include demosaicing, noise reduction, pixel linearization, shading compensation, resolution reduction, vignette elimination, and/or 3 A related operations including automatic white balance (AWB), automatic focus (AF), and/or automatic exposure (AE) modifications, and so forth.

Optionally, this operation also may include obtaining depth data when the depth data is used for segmentation analysis. Depth image data may be determined by a stereo camera system, such as with RGBD cameras, that captures images of the same scene from multiple angles. The system may perform a number of computations to determine a 3D space for the scene in the image and the depth dimension for each point, pixel, or feature in the image. Otherwise, other ways to determine three dimensions from a single camera are possible such as time-of-flight, and structural or coded light technologies.

Process 400 may include "pair local device to at least one object shown in an image and on a wireless network" 404. As mentioned, the wireless network may be radio networks such as a short-wavelength radio network, may be a short-range network, and by one example, may be a Bluetooth® network with specifications according to Bluetooth 5, by one example (See, www.bluetooth.com/specifications). Thus, both the local device and the at least one object may have a wireless network unit, which may be a receiver, a transmitter, or a transceiver, and may have access to stored metadata that can be received and/or transmitted to other wireless network units. This operation occurs when the wireless network unit of the local device has found the wireless network unit of the object (or vice-versa) and a connection is established for transmission of data between the two units. It will also be understood that the pairing may occur automatically when the local device and objects are in range of each other. Otherwise, manual pairing could be performed where a user activates a device to search for other devices with a similar wireless network, and then may select which devices to pair to. Many variations are contemplated.

By other alternatives, no pairing is necessary solely for establishing an AoT and deriving the b and h components of the AoT. In this case, connection-less methods of Bluetooth® Angle of Arrival or Departure may be used where pairing, connections, and/or even association is not required for shared and/or public assets, as with BT beacons by one example. The wireless network units are detected, and simple detection permits locating the unit, and in turn the AoT can be established. This may occur with asset tracking applications described below.

The object or peer device may be any object with a wireless network unit. Thus, the object may be any electronic device with the wireless network unit being integral to the rest of the electronics of the object such as with a television. For example, the wireless network unit could be mounted on the same circuit board as other components of the object, and could be used to perform tasks unrelated to data transmission. By other forms, the wireless network unit is kept and used separately from other electronic components of the object. Otherwise, the wireless network unit may be, or may be on, a chip or tag on a non-electronic object such as a table or chair.

Also as mentioned, the data being transmitted that establishes the AoT being used to measure the distance along the AoT may or may not be related to the image of the object to be displayed on a screen or FOV of the local device. For example, the data could be light-based or audio data. By another alternative, a different network may provide the angle of transmission such as an optical network, while object data is still transmitted on a BT network.

Process 400 may include "calculate distance D along angle of transmission (AoT) between first network unit on local device and second network unit on object, and calculated by using transmission parameters between the local device and object" 406, and as mentioned includes an Angle of Arrival or Angle of Departure as well.

Referring to FIG. 5, a diagram 500 is formed to compute a distance D between a wireless network unit 506 on a local device (or camera) 502 and a wireless network unit 508 on an object plane 504. It is assumed that a plane formed by the FOV of the local device (simply referred to herein as the FOV plane) 503 includes the wireless network unit 506 on the plane 503. The FOV plane 503 faces the optical direction of the local device, and while usually considered perpendicular to the optical direction, could be non-perpendicular as long as the plane is orthogonal to the optical direction. Also, it is assumed that the FOV plane 503 is parallel to the object plane 504 formed by the object and includes the wireless network unit 508 on the object plane 504. The object plane 504 may or may not represent a surface of the object and is meant as a reference location on the object and at the wireless network unit 508. The FOV plane 503 and object plane 504 can form opposite ends of a cuboid 510, where a perpendicular line 512 from the wireless network unit 508 is perpendicular to the FOV plane 503 and forms an edge of the cuboid 510. Both planes 503 and 504 define x (horizontal) and y (vertical) axes of their own coordinate systems.

Figure 6:
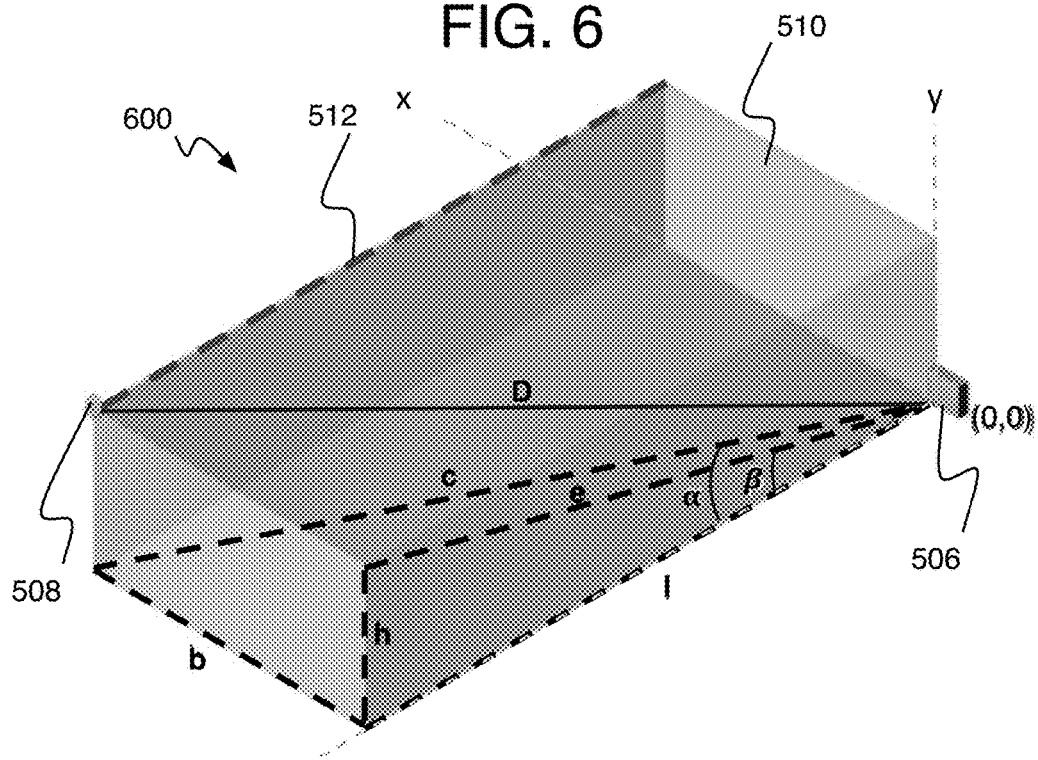
FIG. 6 is a schematic diagram to show the arrangement of a distance between a wireless network unit on a local device and another wireless network device on an object and components of the distance according to the implementations herein.

Referring to FIG. 6, a diagram 600 of the cuboid 510 shows a distance D that is the actual linear (or line-of-sight) distance between the wireless network unit 508 at the object and the wireless network unit 506 at the local device (or camera FOV), and represents the angle of Transmission (or arrival or departure depending on which unit is being referred to). It should be noted that the wireless network unit 506 is off to the side of the FOV along a border portion, such as with a tablet or smartphone, rather than directly on (or under) the surface forming the FOV, but could be otherwise.

The distance D (or line of sight) may be computed by using the actual and reference power values of the transmission. Specifically, information of Tx power and received signal strength indicator (RSSI) can result in very accurate identification of a peer wireless device in physical space. RSSI, which is a reference transmission power or signal level, is a measurement of the power present in a received radio signal. RSSI is often performed in the intermediate frequency (IF) stage before an IF amplifier. In zero-IF systems, it is performed in the baseband signal chain, before the baseband amplifier. RSSI output is often a DC analog level. It also can be sampled by an internal ADC, and the resulting codes available directly or via a peripheral or internal processor bus. Such is detail is provided by Section 1.5 of the Supplement to the Bluetooth® Core Specification, CSS Version 7. Tx power is the actual transmission power or signal level and is provided in dBm for one example. One example distance equation is:

$$D=(10^{\wedge}((TxPower-RSSI)/(10*n))) \quad (1)$$

where n is the signal propagation constant or path loss component, and distance D is in meters. Note that, there are other standard methods to find distance between peer wireless devices that could be used here as well, and examples include use of RTT (Round Trip Time) along with precision time protocol (PTP). The accuracy of measurement is implementation dependent. See for example, https://www.net.in.tum.de/fileadmin/bibtex/publications/papers/tkn_04_16_paper3-.pdf and/or https://rd.springer.com/chapter/10.1007/11422778_62.

Once distance D is determined, process 400 may include "compute at least the width b and height h components of the distance D" 408. The line forming the distance D may be projected to a horizontal side of the cuboid 510 forming a line c at a horizontal angle α from a perpendicular line l forming another edge of the cuboid 510, and projected to a vertical side of the cuboid 510 forming a line e a vertical angle β from the perpendicular line l. With these arrangements, the components of the distance D can be computed including a width b, height h, and length l (also the same as line l). The width b and height h are parallel to the object plane 504, and therefore, are also parallel to the FOV plane 503, and in turn, extend in the x and y directions of the FOV plane 503.

Figure 7:
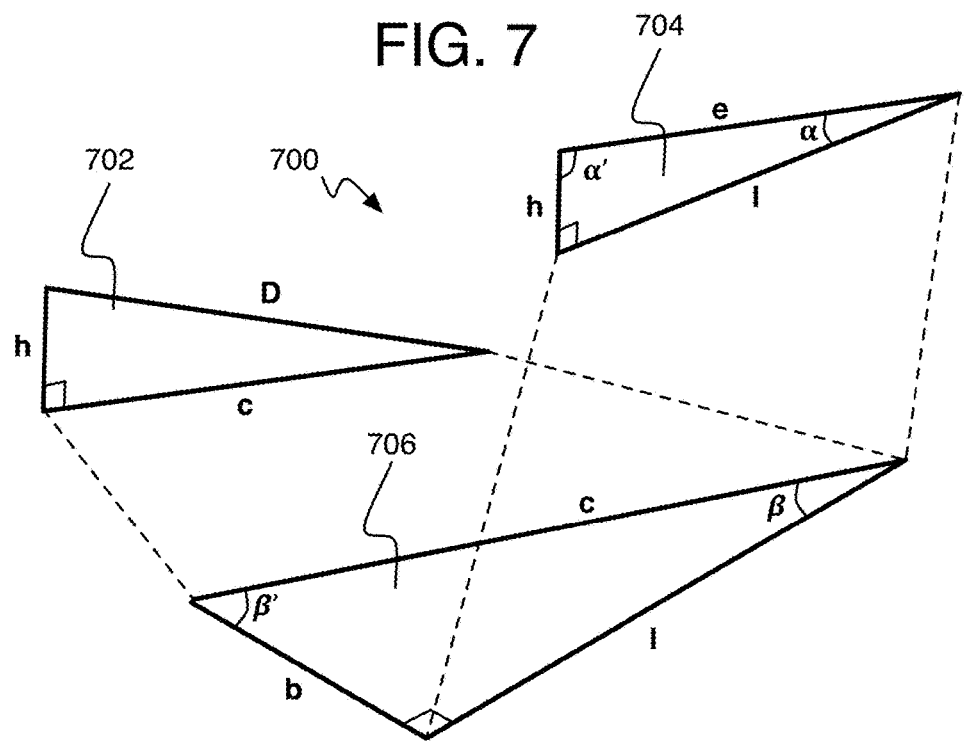
FIG. 7 is a schematic diagram of distance components of the distance of FIG. 6 according to the implementations herein.

Referring to FIG. 7, a diagram 700 shows the trigonometric arrangements from the cuboid 510 and with the components b, h, and l, and which are depicted as triangles 702, 704, and 706. Specifically, using the following theorems:

$$\sin(90°) = 1 \quad (2)$$

$$\alpha' = 90 - \alpha \quad (3)$$

$$\beta' = 90 - \beta \quad (4)$$

$$\sin(90° - x) = \cos(x) \quad (5)$$

$$h^2 + c^2 = D^2 \quad (6)$$

$$\frac{l}{\sin(\alpha')} = \frac{b}{\sin(\alpha)} = \frac{c}{\sin(90°)} \quad (7)$$

$$\frac{l}{\sin(\beta')} = \frac{h}{\sin(\beta)} = \frac{e}{\sin(90°)} \quad (8)$$

the following component equations can be established:

$$l = \frac{D\cos(\alpha)\cos(\beta)}{\sqrt{1 - \sin^2(\alpha)\sin^2(\beta)}} \quad (9)$$

$$b = \frac{D\sin(\alpha)\cos(\beta)}{\sqrt{1 - \sin^2(\alpha)\sin^2(\beta)}} \quad (10)$$

$$h = \frac{D\cos(\alpha)\sin(\beta)}{\sqrt{1 - \sin^2(\alpha)\sin^2(\beta)}} \quad (11)$$

Once the distance components b and h are computed, process 400 may include "scale the components to translate second network unit of object to location in field of view (FOV) of local device" 410. Particularly, when viewed from the camera FOV in the local device, the position of the second network unit on the object relative to the first network unit on the local device is given by 2D components (b, h). These are real world dimensions however. Since the position and distance of the first network unit on the local device to a position (such as (0, 0)) on the FOV is known, and the scale of the image is known by using 3D depth maps for example (such as mm/pixel depending on the depth set in the image), then the 2D distance from the first network unit to an anchor location of the second network unit in the FOV can be determined by scaling b and h to the scale of the image. Thus, by one form, scaling here refers to shifting the origin from (0, 0) to the actual position (in the image units) of the wireless network unit on the local device.

Then to determine the position of the object (or object region) in the FOV, process 400 may include "obtain, from the object, data of object dimensions and location of second network unit on the object" 412. Initially, it is assumed that the first and second network units on the local and peer device each is located at an origin (0, 0, 0) in their own respective coordinate systems. Each device has its own coordinate system with x, y, z axes, and the dimensions of the object or local device are stored where it is accessible to the network units. Thus, the location of the second network unit on the object as well as the dimensions of the object can be transmitted to the local device. The location of the object, with its dimensions scaled for placement on the FOV of the local device, can then be determined, where the object region is placed so the second network unit is located at the scaled (b, h) coordinates (or object region anchor position) of the FOV. By another alternative, a standardized reference of origin for every network unit enabled device may be assumed to be at the centroid of the 3D object, and the location of network unit is a X, Y, Z location in mm from the origin (as a 16 bit unsigned value for transmitting as metadata by one example).

The outer dimensions of the object can be based on the format of a standard (ASCII) shape, number of sides to the object, length of each side in mm with the first side starting from a standard position like North and extending clockwise (as a 32 bit unsigned value for transmitting as metadata for example). Thus, both the location of the second network unit on the object and the dimensions of the object may be transmitted as metadata form the second network unit to the first network unit. The metadata also may include the shape (cylindrical, conical, etc.), material (smooth, rough, texture, etc.), exact color (per pixel color map for example), and so forth. Any one or combination of these may be used to accelerate the segmentation as compared to conventional image segmentation by providing the correct color and texture. Color based segmentation relies on clustering regions based on color similarity in a certain color space, like RGB, while texture based segmentation relies on frequency analysis of the image to cluster based on groups of frequencies that are close to each other that may represent a particular type of texture.

Process 400 may include "determine location of bounding box object on FOV of local device by using the object data" 414. In order to finalize the outer boundary of the object region on the FOV, the object region still must match the perspective of the image in the FOV. This may be accomplished by using the sensor data of the local device and object. Typically, an inertial measurement unit (IMU) on the object may have a gyroscope, accelerometer, and a digital compass (magnetometer). The gyroscope and accelerometer provide relative orientation with respect to gravity. A digital compass provides relative orientation with respect to earth's magnetic field. This provides x, y, and z directions of the object so that the global orientation of the object in 3D space is determined and saved. The global orientation then can be transmitted from the second network unit to the first network unit. The local device (camera) also has an IMU. This is particularly true for cameras mounted on a Head-Mounted-Display (HMD) to provide augmented or modified reality. Thus the global orientation of the local device relative to gravity and the North direction is also known, and may be determined by using the same IMU sensors. Thus, once the distance and anchor location of the object region is known in the FOV. The orientation of the object region relative to the FOV can be determined by using a transform to properly place or rotate the object into the correct orientation.

Alternatively, segmentation may provide a rough segmentation of the object region from other areas of the image and that provides a rough outer boundary of the object region, and the object region as anchored in the FOV by the position of the second network unit, and considering the dimensions of the object, then could be rotated at the anchor point to best fit the rough segmentation. This, however, may not be as efficient as the use of the transmitted global orientation of the object since it requires some pixel data segmentation analysis of the object.

Either way, the final position of the object region on the FOV is now complete, where the position includes the location of the object region, or particularly the second network unit on the FOV as an anchor point scaled from coordinates of the second network unit received form the object, the size of the object as determined from dimensions received from the object, and the local orientation of the object calculated from the received global orientation of the object.

The final position, given the dimensions received from the object, may be in single pixel accuracy, or even sub-pixel accuracy (which may be rounded as needed). Once set on the FOV, the outer boundary of the object region is set as the bounding box of the object region as shown around the object regions in the FOV of the local device 200 (FIG. 2). It will be understood that in some cases, the bounding box must remain a quadrilateral as either a rectangle or square, and may include pixel areas within the bounding box that are not part of the object region when providing the quadrilateral bounding box is a priority. The bounding box may be as small as possible while including the entire object region, but other variations are possible where the bounding box is a little larger than the object region within it providing background or non-object area around the object and within the bounding box. By other alternatives, the bounding box may be arbitrary shapes and is set substantially on the exact outer boundary or contour of the object region in 2D for example, even when the FOV shows the object region in a 3D perspective. IN these case, the peer device can publish this information by defining an equation to represent the shape as part of the metadata.

By one option, process 400 may include "perform segmentation using the bounding box" 416. One or more objects in the image, each with its own bounding box for example, are considered a final segmentation. The bounding boxes may be subtracted from the image to then apply conventional segmentation to the remainder of the image. Details are provided in a segmentation process 800 (FIG. 8). Segmentation may be performed for certain tasks like image modification that do not require object detection, or segmentation may be an initial operation for object detection.

Process 400 may include "perform object classification" 418, and the segmented objects may be used to provide efficient object detection by using the AoT-based objects. More details are provided below with process 900 (FIG. 9).

Process 400 may include "place object position(s) in metadata for later use" 420. Here, the determined object positions may be transmitted back to one or more of the objects along with the object identifications. When a single object can store data of other objects in the vicinity, a local device may obtain the data of multiple objects in a single image or area around the object so that the position and/or identification of each object does not need to be determined individually, saving a significant amount of time and computations. More details are provided with the object detection process 900 (FIG. 9). Such an arrangement also enables the control or command of multiple devices by a single local device or single control object to create a cooperative effect. Such a process 1100 (FIG. 11) provides details for such an operation.

Process 400 may include "use AoT object identification for deep learning training" 422. Particularly, automatically obtaining object identification via wireless network units enables continuous training of a machine learning classifier that operates the object detection. More details are provided below with process 1000 (FIG. 10).

Also, by another option, process 400 may include "perform object asset tracking" 424 where once the position of an object region is determined using the AoT, the object region can be tracked from frame to frame in a video sequence without solely relying on feature matching to identify the same object that is on a number of images (or frames) over time. Other details are provided below.

Referring to FIG. 8, a process 800 is provided for a method of determining object positions for image processing using wireless network angle of transmission, and including operations for segmentation. In the illustrated implementation, process 800 may include one or more operations, functions or actions 802 to 818 numbered evenly. By way of non-limiting example, process 800 may be described herein with reference to example image processing system 200 of FIG. 2, or system 1200 of FIG. 12, and where relevant.

Process 800 may include "perform pre-processing on at least one image" 802, and as mentioned above, pre-processing of raw data, which may include generation of a 3D map, may be performed as images are being captured by an image capture device (or local or control device) sufficient to perform segmentation.

Process 800 may include "obtain position of at least one object on the at least one image using the object AoT" 804, and by using the process 400 already explained above that measures the line-of-sight or linear distance from the network unit on the local device and the network unit on at least one object that is shown in an object region on the image of the FOV of the local device. The distance along this angle of transmission (AoT) is measured by using the Tx and RSSI power values of the transmission, although other methods could be used, such as triangulation if necessary. Once the distance is determined, the components of the distance may be determined which results in components (b, h) that extend in x and y 2D directions of a plane forming the FOV of the local device. The system then may use scaling to position the network unit of the object on the FOV, and then metadata from the object to size and position the object region onto the FOV as well. The final boundary around the object region and in the FOV may be formed of a boundary box, whether actually box shaped or having a specific shape (or contour) of the object. The boundary boxes are otherwise as described above.

This operation may include "determine positions of bounded boxes of at least one object" 806. Thus, by one form, the positions of the bounded boxes of the objects in the image positioned by using the AoT are obtained. By some alternatives, the boundary of an object region is formed of the object dimensions or pixel membership in the object, but no box-shaped boundary box is established. Process 800 then may include "subtract areas of at least one object from the at least one image to form remaining area of the at least one image" 808. Thus, the areas already segmented by using the AoT are subtracted, and the process 800 may include "perform segmentation of other objects on remaining area" 810.

The conventional segmentation on the remaining area may include "determine at least one rough region of image with similar data" 812. Thus, an initial segmentation is performed where areas of roughly the same pixel data, such as the same or similar chroma values or the same or similar pattern, or texture, of chroma values, are considered the same rough region. This may include foreground versus background segments to name one example. This may be in the form of a binary segmentation map (or more values when more than two segments exist). The initial rough segmentation may be performed by color-based analysis, depth data analysis, or even by tracking object's contour from previous frames to name a few examples. Thus, the process may use other object recognition techniques (edge corner detection and so forth) for the rough segmentation or may in fact use known object tracking segmentation where the rough segmentation is applied after a frame that is considered to have the initial segmentation.

The rough segmentation may be performed by using color (and/or intensity) based methods that may include a graph-cut method (such as Grabcut), Deep-Learning methods (based on convolutional neural networks for example), or class specific methods, such as an algorithm which is segmenting at the rough boundary of an object such as a person rather than using a rectangle or bounding box. A conventional depth data analysis background-foreground segmentation may use a weighted combination of the color and depth data of the pixels to determine whether the pixels are part of the background or the foreground. See for example, Blanc-Talon et al., *Extended GrabCut for 3D and RGB-D Point Clouds*, Proceedings at Advanced Concepts for Intelligent Vision Systems, 15th International Conference (2013), and Hickson et al., *Efficient Hierarchical Graph-Based Segmentation of RGBD Videos*, Proceedings of IEEE Conference on Computer Vision and Pattern Recognition (CVPR) (2014). These methods describe a graph cut approach that is extended by creating node weights based on both RGB and depth. These methods attempt to "fuse" depth and color information at a low level for an entire area that is to be segmented. Other methods may use depth data alone for determining a rough or initial segmentation.

Process 800 may include "determine similarities between regions and merge regions to form final regions" 814. For this operation, numerous small regions may be merged to establish large similar regions that should be part of the same object. This may include a second pass of the same algorithms used to form the first rough regions, and/or connected component analysis techniques.

Process 800 may include "refine contours of boundaries of each final region" 816. The segmentation map then may be used to set a border area such as an unknown region or narrow band extending along the border between the initial segments of non-AoT-based regions forming a tri-map with an unknown region so that a more precise segmentation can be applied within or at the unknown region rather than the entire image. Thus, by one technique, an initial, rough segmentation is performed, and a narrow band is set at the border between the segmentations. A separate more precise algorithm is then used to determine the segmentation of the pixels within the band to provide a final refined segmentation.

The setting of the unknown region may simply include providing the rough binary segmentation map of the remaining areas of the image and that indicates a border between two segments and to a function to find and set the unknown regions, and the initial contours within the unknown regions. Thus, this may be performed without actually first identifying unknown regions although that is the effect of the function. By some alternatives, the unknown regions of an image may be identified manually or automatically by analyzing the initial rough segmentation map by a separate algorithm or module than a function used to perform contour identification. In this case, the setting of the unknown region may be performed by such techniques similar to parallel curve or other similar shaping techniques (see for example, en.wikipedia.org/wiki/Parallel curve). Otherwise, functions used to perform contour identification and contour type classification may be used to set the unknown region such as the openCV find contour function. See, for example, the find contour function as described by: http://docs.opencv.org/2.4/modules/imgproc/doc/structural_analysis_and_shape_descriptors.html #findcontours, and Suzuki, S. and Abe, K., Topological Structural Analysis of Digitized Binary Images by Border Following. CVGIP 30 1, pp 32-46 (1985). Thus, the initial segmentation map of the entire image (or parts of the image where segmentation is desired) is provided to the function, and the function extracts all the contours of the image.

Rough contours within the unknown region may be the input to a more precise algorithm relative to depth-based or other algorithms used for the rough segmentation such as, by one example, the active contour algorithm that asserts a penalty to any change from the initial set such that points shifted outside of the unknown region are ignored, but a maximum distance limit within the region is not enforced either. As mentioned, however, a precision graph-cut or other type of algorithm could also be applied to the unknown region to generate an initial contour (or more precise unknown region location) that is to be used as an initial basis for segmentation in the following frames. By one example, the unknown region width may be fixed, and is set at about or exactly 10 pixels wide, and this width may be maintained for the length of the initial rough segmentation.

As to the form of the resulting contour (or unknown region), the components (or objects or segments) may be represented by a full matrix or initial segmentation mask such as a binary segmentation map that shows where adjacent pixels have different segments. A border contour then is formed by the pixel sides or edges between those opposite pixels. By another way, the contours are listed as a series of junction coordinates. Particularly, a single long contour actually may be formed of many small contours. Thus, adjacent segments (object or component or shape) may have its pixels labeled with a different value (0 or 1) for each separate contour within the unknown region. This may include a representation that may be referred to as the "minimal representation" because it is the minimal count of pixel points (such as five) to fully represent a rectangular shape. Specifically, the initial segmentation may result in a segmentation map or binary map that labels each or numerous pixels with a 0 or 1 to indicate which segment the pixel belongs. The initial contour may be in the form of a tri-map or mask as the result of the initial segmentation, and that indicates the location of the unknown region as well as the initial contours within that unknown region. Many variations are possible.

Color and/or luminance data then may be used to perform the more precise segmentation at the unknown regions. Such a technique is disclosed by U.S. patent application Ser. No. 14/925,057, filed Oct. 28, 2015, which is incorporated in its entirety herein for all purposes. Many other variations are possible. These too may be based on graph-cut, and many different techniques may be used for determining weights and the minimum cost and/or maximum flow, including many different extensions or variations including Grabcut, variations that use depth data, and so forth. Otherwise, an active contour algorithm minimizes an energy function associated with a contour. The energy function is an iteratively minimizing equation where internal energy controls the deformations to the shape of the contour while external energy controls fitting of the contour onto the image (or in this case, the border of a segment). A final contour, by its final point positions, is returned as output. One such active contour technique is provided by Mille, *Parameterized Narrow Band Active Contour*, Universite' François Rabelais de Tours, Laboratoire Informatique (EA2101) (http://liris.c-nrs.fr/Documents/Liris-4476.pdf). For each segmented object in the image, the result is a final region, or region of interest, that is a single object, and may be an object bounded by a bounding box defining the outer boundary of the region or region of interest (ROI).

As mentioned, the segmented object then may be used to modify the image by augmenting the objects or moving or warping the objects. Otherwise, the objects may be activators for a further action by a user selecting the object by pointing to it or using a cursor for example. Some segmentation may be provided for medical imaging. The segmentation also may be used for efficiency in other image processing such as encoding efficiency, clustering, or pattern recognition related tasks, and so forth. These applications may be the end-goal of the segmentation. Alternatively, the segmented regions may be used for object detection as follows.

Process 800 also may alternatively, or additionally, include "track objects from frame to frame on a video sequence" 818. It will be understood that the generation of the AoT and component distances may be used to track an object, or specifically an object region, on the images, and from frame to frame in a video sequence being recorded or received. Thus, once the position of an object region is determined on one frame, the object region may be determined by finding the same position on a subsequent frame (since an object region position on a frame should not move too significantly at 30 fps for example even when the object is moving fast from a person's perspective), or the object region position may be recomputed by using the AoT again, and the computed positions then may be matched (or determined which are sufficiently similar to indicate the same object. Other variations are contemplated. It also will be understood that the object tracking may be implemented whether or not box-shaped bounding boxes are generated to define an object or region (or a more specific contour of an object is used instead), and whether or not segmentation of the entire image is performed with non-AoT determined object regions, or even whether or not other AoT positions of object regions in the same single image are searched for, and/or found.

Referring to FIG. 9, a process 900 is provided for a method of determining object positions for image processing using wireless network angle of transmission, and including operations for object detection. In the illustrated implementation, process 900 may include one or more operations, functions or actions 902 to 918 numbered evenly. By way of non-limiting example, process 900 may be described herein with reference to example image processing system 200 of FIG. 2, or system 1200 of FIG. 12, and where relevant.

Process 900 may include "perform pre-processing on at least one image" 902, and this may be the same as for operation 802 of process 800 for segmentation. Then, process 900 may include "perform object region proposal generation to determine candidate regions of interest (ROIs)" 904, and here this may include the same or similar operations performed by segmentation process 800 as one example. Relevant here, process 900 may include "determine positions of bounded boxes of at least one object with wireless network unit using the AOT of the unit" 906. Thus, the result is segmentation of one or more objects with wireless network units and that are segmented by using the angle of transmission. Also, process 900 may include "determine position of other objects in image without a wireless network unit" 908, and these other objects of the same image of FOV may be segmented by conventional methods as with process 800. Both may or may not have box-shaped bounding boxes that define the outer boundaries of the objects. These objects or ROIs are then provided for object detection. Providing the AoT-based ROIs that reduces or omits the pixel data analysis of the segmentation is much more efficient and accurate for performing object detection.

Then, process 900 may include "classify the objects using ROIs in machine learning classifier" 910. By one form, images of the ROIs are provided as the input to a machine learning classifier performing the object detection as described in detail above. The machine learning classifier may be a CNN trained to classify the objects into thousands or even millions of recognized objects. By one form, the input ROIs are images of an object or region on an FOV without any label associated with the input ROI. By another form, the ROI input that are formed by using the AoT are annotated with a label obtained from the metadata of an object and generated either from a previous object detection session or as an initial class for a new object not yet input for object detection during run-time. The initial class (or initial object identification) is stored in the object metadata when the other metadata is stored for an object. During run-time, the classifier is able to perform the classification whether or not the input ROI has a label. This is in contrast to the training which requires the ROI to have a label, whether provided manually or generated automatically as mentioned herein. It should be noted that a combined machine learning classifier, such as CNN may be used where both the ROI image and label are input, and simply receives no labels when not provided, to generate final scores for an input ROI and label. Alternatively, it can be understood that separate machine learning mechanisms, such as CNNs, could be provided for ROI images and their labels, which then combines scores to determine a final score. Many variations are possible.

Other variations as to the type of neural network that can be used or alternative systems to neural networks are also known. The result is a score indicating a normalized confidence of a classification label for each available class, and there may be thousands of available classes, where the maximum score indicates the most likely label for the object as classified by the CNN.

By one option, process 900 may include "store object class data of object in metadata of wireless network unit of object, and for individual or each object" 912. By this form, the identification of the object as the result of the object detection may be stored as metadata at the associated object. In this case, the image of the ROI may be annotated with the label of the object identification and then stored for future object detection operations. The metadata may be stored a memory on the wireless network unit on the object, or a memory that is otherwise accessible by the wireless network unit. By one form, a metadata container specification can be similar to that of the specification 1484.12.1TM IEEE Standard for Learning Object Metadata (http://ieeexplore.ieee.org/stamp/stamp.jsp?arnumber=1032843). By other alternatives, another network device on the object (such as WiFi) that can transmit and/or receive the data also may be used. With this arrangement, the next time a local device places the object region of an object into an FOV of the local device, the object identification is already present and object detection will be more accurate due to the annotation of the ROI with the class label. As mentioned, the classifier considers the label when scoring the available classes. The accuracy of the object classification is improved by using this method because zero false positives in regions with objects pre-annotated based on the AoT and from the wireless network unit of the object are reduced, and which otherwise may be mis-classified by the network.

By another option, process 900 may include "store object class data and position data of multiple objects in metadata of wireless network unit of object, and for individual or each object" 914. For this operation, the object identification for multiple objects are stored at a single object. For example, the data may include that the object storing the data is a television at a certain position, and another object is a speaker 1 meter in a certain direction from the television, and so forth. With this arrangement, when the local device receives the metadata from this object, it immediately learns the annotated object identification and positions of both objects so that segmentation can be skipped, and the distance component computation can be skipped, for all such linked objects except one, since the position is relative to that one object and its segmented boundary or bounding box is already established. Also as mentioned, the ROI of the object as annotated with the object identification or initial class makes the object detection more accurate. The machine learning classifier considers the annotation and matches it to its known class labels as part of its output score determination. This can be true for each one of multiple objects in the FOV of a local device.

Process 900 may include "perform segmentation by using the object positions" 916, and/or process 900 may include "perform object detection by using the object class data" 918, and particularly, the next time the object(s) are placed in the FOV of the local device or another local device, the metadata may be obtained from one or more of the objects and used as mentioned. By one form, the metadata may be used in multiple player MR or AR where the objects may be in one view of one player and then moved (or added) to the view of another player in a different perspective than that of the first player.

This method improves accuracy of the region bounding box of objects classified by the network, due to segmentation of known existing objects by wireless network AoT operations, and even improves classification of bounding boxes in cases where the objects are occluded by non-wireless network objects. In other words, the present methods are better at identifying objects that are partially or wholly blocked form view in the FOV of a local device since the 3D positions are determined from metadata rather than image data analysis (to determine a 3D position for example).

Referring to FIG. 10, a process 1000 is provided for a method of determining object positions for image processing using wireless network angle of transmission, and including operations for training a machine learning classifier for object detection. In the illustrated implementation, process 1000 may include one or more operations, functions or actions 1002 to 1014 numbered evenly. By way of non-limiting example, process 1000 may be described herein with reference to example image processing system 200 of FIG. 2, or system 1200 of FIG. 12, and where relevant.

Process 1000 may include "pair with object(s) in image that have wireless network unit" 1002, and this is as described above for the run-time operations. Process 1000 then may include "determine position of object on image using AOT" 1004, and as already described above as well. Thus, this may include the automatic placement of a bounding box on an image of the object (or ROI), during or after segmentation.

Process 1000 may include "obtain object identification including class transmitted from object" 1006. Also as mentioned, a machine learning classifier, may use deep learning such as a DNN or CNN to determine class scores, where the class of the highest score is the class or identification of the object. Such a highest score class is identified, by one example, whether or not the object class has been experienced by the machine learning classifier before.

The training may be performed when the highest score selected does not meet a certain threshold, which indicates a new class is being experienced. In this case, it does not matter whether or not an input ROI is annotated with a label yet when input to the classifier during run-time object detection. By this form, an ROI may not have a label until object detection is applied to the ROI during run-time. Once applied, the resulting class is saved in the object metadata at the object to be used to annotate the ROI image for object detection in the future.

Alternatively, objects may have initial object identification labels for annotating images of the ROI of the object and placed in the metadata during initial storage of the metadata before the object is exposed to a wireless network (unless during updating) and to be transmitted to the local device during run-time for object detection, and before deployment. Once object detection is applied, the resulting class replaces the initial label in the metadata of the object. In this case, a new class is experienced when the annotation (or label) of the input ROI is not the same as any classes expected by the machine learning classifier. To accomplish this, process 1000 may include "automatically annotate ROI of object with metadata label" 1008, and this may be performed to retrieve the annotation of the ROI from the metadata of the object during run-time. Otherwise, by other alternatives, the new classes are manually fed to the network to the last regression stage that does the classification even though the ROI labels are automatically generated. Thereafter, a network capable of continuous learning, that is learning while classifying, will update its weights based on the new object introduced.

Then, process 1000 may include "automatically add new class to machine learning classifier output" 1010. Thus, when a new class is being experienced, the new class image and annotation are added to the lists of classes. Process 1000 then may include "train machine learning classifier to identify objects of new class" 1012. As mentioned above, the training proceeds to learn the weights for different layers of the network by minimizing errors during multiple forward and backward passes through the network, until it reaches a convergence threshold with minimum error that identifies the correct class for the new input ROI and annotation label.

Process 1000 may include "provide continuous object detection by repeating for individual or each new class encountered as a video sequence is being captured" 1014. Therefore, the training may continue during run-time and as new objects are being experienced to update the machine learning classifier, resulting in a good user experience where many objects in the FOV may be identified.

Figure 11:
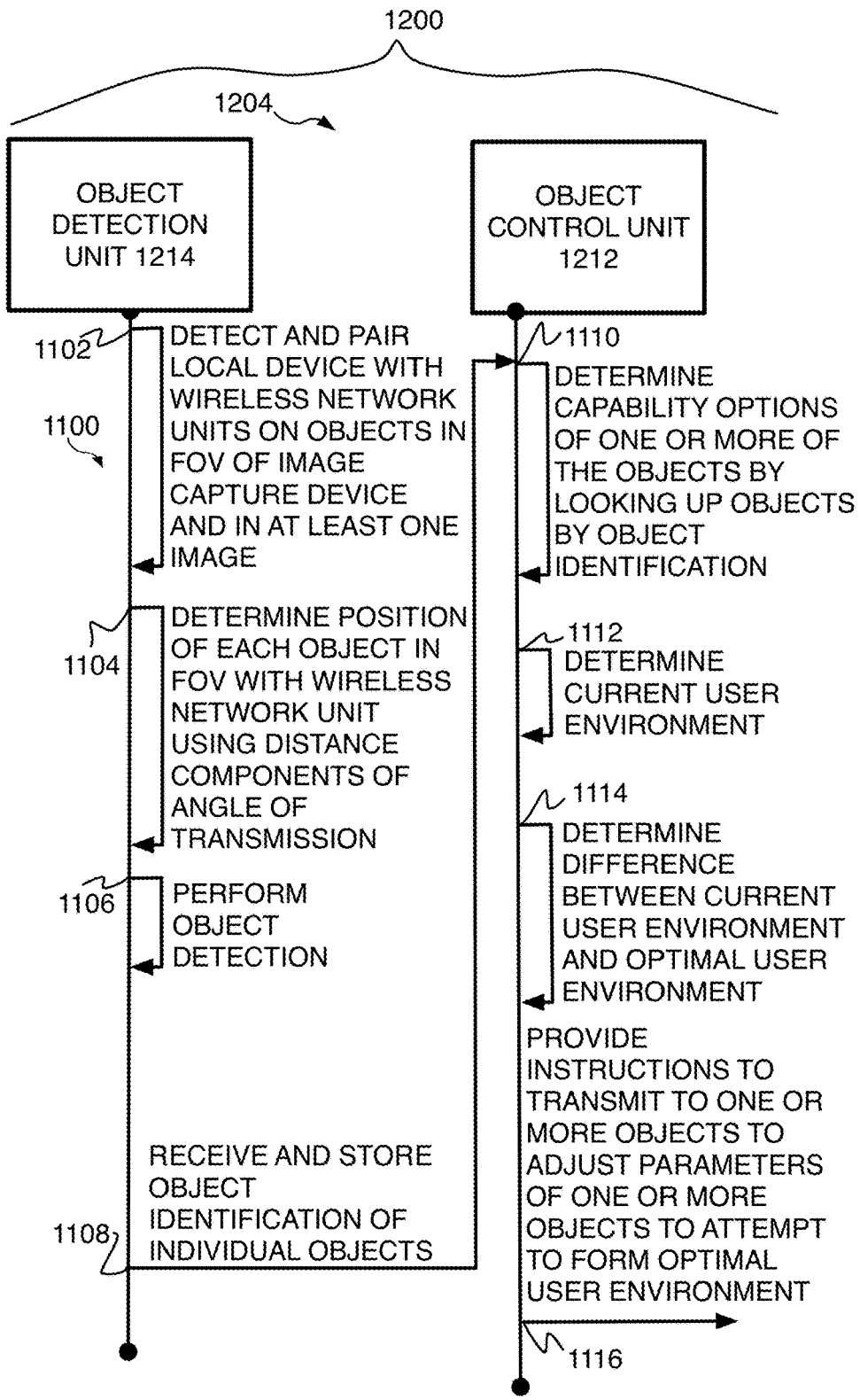
FIG. 11 is a diagram of a method of determining object positions for multi-object control and in operation of an example system described herein.

Referring to FIG. 11, process 1100 illustrates the operation of a sample image processing system 1200 for a method of determining object positions for image processing using wireless network angle of transmission, and including control or command of the objects, in accordance with at least some implementations of the present disclosure. In more detail, in the illustrated form, process 1100 may include one or more operations, functions or actions as illustrated by one or more of actions 1102 to 1116 numbered evenly. By way of non-limiting example, process 1100 will be described herein with reference to FIG. 12. Specifically, system 1200 includes logic units or modules 1204. The logic modules 1204 may include an object detection unit 1210 and an object control unit 1212. These units determine the position of the objects, classify the objects, and then may control the objects to perform some task such as to create a certain user environment as one example. The operation of the system may proceed as follows.

Process 1100 may include "detect and pair local device with wireless network units on objects in FOV of image capture device and in at least one image" 1102. As described above, in order to generate the FOV, this operation preliminarily may include obtaining the captured raw image data that has already been pre-processed sufficiently for segmentation and may provide pixel color and luminance values and/or other data such as gradients, histograms, and so forth. This also may include image data analyzed to provide a depth map when available. It will be understood that since the frames are in a video sequence, the form of the frames for obtaining the image data here applies to any of the frames in the sequence.

The local device then can pair with any close object with the wireless network capability, and it will be understood that it can pair with objects whether or not the object is shown on the FOV. Thus, the local device and object must have wireless network units, such as BT chips as described above. Each object network unit may have access to a memory with metadata that may include the location of the network unit on the device or object, the dimensions of the object, the shape, texture, and/or color of the object, a global orientation of the object relative to gravity and North for example, an identity or label of the object, and capabilities or parameter settings of the object that can be adjusted by a control device or other object, and so forth. This metadata may be transmitted to the local device or other paired objects upon establishing a connection.

It also will be understood that the objects may be paired with each other, or at least detected and position determined if not paired as in BT-based beacons, as well in order to transfer the metadata among them.

Process 1100 may include "determine position of each object in FOV with wireless network unit using distance components of angle of transmission" 1104, and as already described above, the distance of the AoT between a network unit on a local device and a network unit on an object can be determined using the Tx and RSSI power levels of the signal, and then the components of the distance can be computed using trigonometric equations (2) to (11) recited above and by assuming a surface of the object with the network unit is parallel to the FOV plane having the other network unit. The result is 2D coordinates (b, h) of the network unit on the object relative to the 2D location of the network unit on the FOV plane of the local device. The (b, h) coordinates are scaled to anchor the object region on the FOV by the location of the network unit on the FOV. The received dimensions and shape of the object can be used to locate the boundaries of the object region on the FOV while the global orientation, along with the location of the object region on the FOV and the global orientation of the local device, and in turn the perspective of the FOV, allows the object region to be oriented in the FOV at the correct perspective. The boundaries of the object region, or bounding box when set, are then known with sufficient accuracy so that conventional segmentation can be omitted for this object.

Process 1100 may include "perform object detection" 1106, also as mentioned, images of the object, as an ROI may be provided to a machine learning classifier, and where the ROI is annotated with the object identification label from the metadata. The object identification could be from a prior object detection operation and is a known class. Otherwise, the object identification could be an original label of the object stored in the metadata before any run-time object detection and is a new class to the current local device. In this case, the classifier may be automatically trained to recognize this new class as described above.

Thus, once classified, process 1100 may include "receive and store object identification of individual objects" 1108, where the object identification or class is stored in the metadata of the object (or network unit on the object). The stored object identification then may be used to annotate the associated object in the future. The object identification also may be stored in the metadata of nearby objects along with the other metadata of those objects so that reading of the metadata of one object may provide all of the information needed for positioning, identification, and control of all objects wirelessly connected to a local device or a main control object. By one form, all nearby objects with wireless network units and that can be recognized by a control device have the metadata of all of the other such nearby objects.

Process 1100 may include "determine capability options of one or more of the objects by looking up objects by object identification" 1110. By one form, the local or control device may be paired with more than one type of object, and may be performing an operation to control one aspect of the user's environment. By one example, the control device may be determining if the lighting is set to the proper levels to avoid glare on a television by one example. In this case, the control object may be the television or another device that controls the television, such as a remote control for the television. In this case, the control device may look up which wireless network objects are lights, and may lookup the metadata from each of the lights. Again, this operation may be activated automatically or as desired by a user activation.

Process 1100 may include "determine current user environment" 1112. The control device may have sensors to be able to detect the environment of the user such as the amount (wattage for example), type (daylight, soft light or other filters), and direction of light facing or near the television as determined by the position data in the metadata. Otherwise, the control device may look up the parameter settings for each light including whether on or off, intensity, and so forth. With these parameters and characteristics, the control device may be able to determine the entire lighting environment in the room with the television. Again, such an operation may be activated automatically or as desired by a user activation.

Other real world environmental factors could be controlled as well such as the temperature, humidity, air quality, power usage by all electrical devices in a building, security locks, alarm systems, clock control, and so forth. Otherwise, such control could be applied to the controlling the motion of the objects from vehicles to toys, and controlling media on media display or audio devices. Many different examples exist.

Process 1100 may include "determine difference between current user environment and optimal user environment" 1114. Here, the control device may be able to calculate, or have lookup tables, that provides a desired optimal environment. In the present example, it may be determined that the current light level is not optimal and should be adjusted to avoid glare on the television. The amount of the adjustment may be determined depending on the difference.

Process 1100 may include "provide instructions to transmit to one or more objects to adjust parameters of one or more objects to attempt to form optimal user environment" 1116, where the control device controls the objects to adjust the parameter settings at the objects to attempt to attain the desired environmental effect. Many different types of parameters could be adjusted in this way by initially relying on AoT-based segmentation and object detection. Also as mentioned, the control device may be one of the objects that had its object region positioned on an FOV and identified by a local device as described above.

In addition, any one or more of the operations of FIGS. 3, 4, and 8-11 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or fixed function firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or fixed function firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 12:
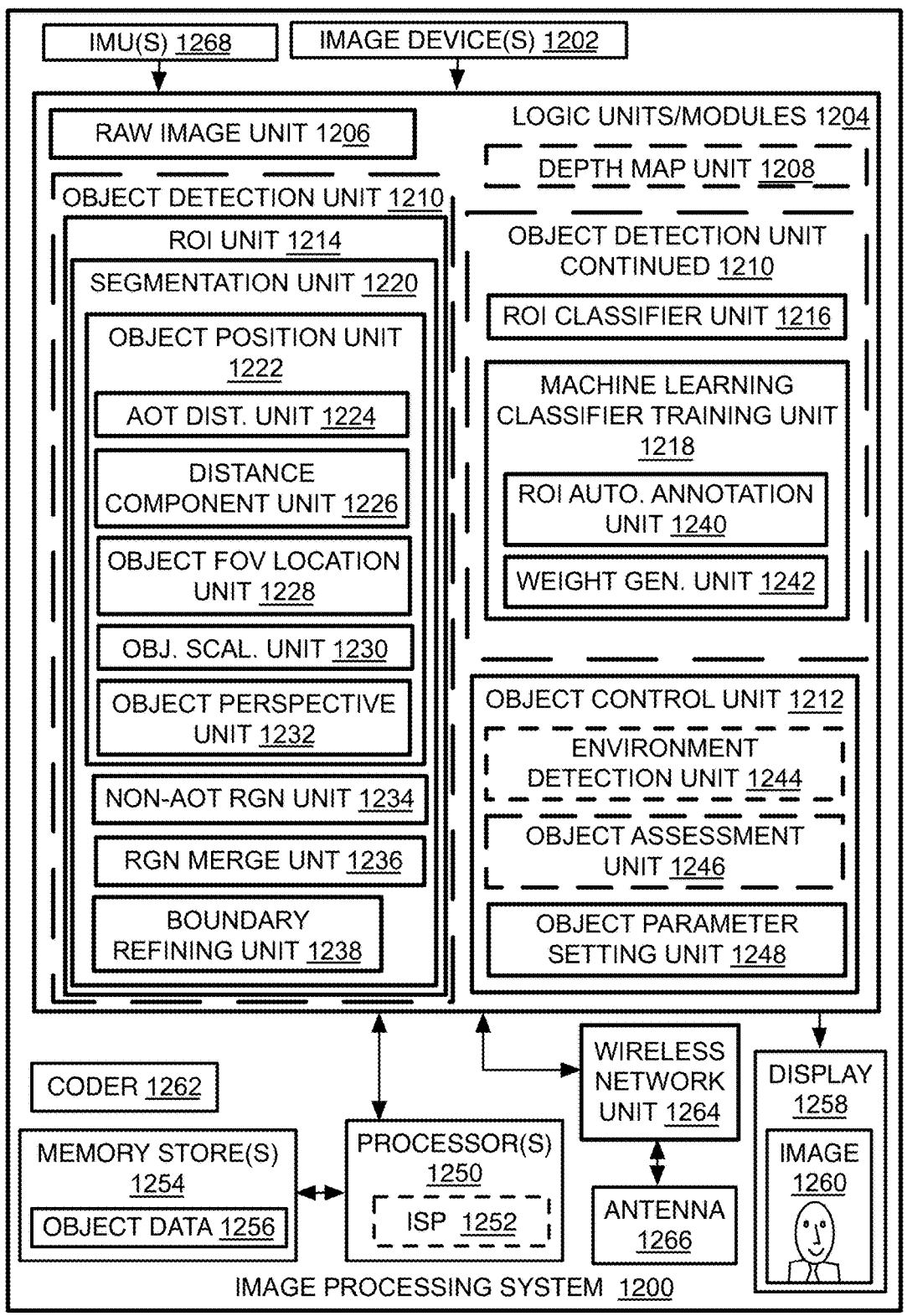
FIG. 12 is an illustrative diagram of an example system.

Referring to FIG. 12, an example image processing system 1200 is arranged in accordance with at least some implementations of the present disclosure and may be, or have, the local or control device providing an FOV as described above. Alternatively, system 1200 may be, or may have, a peer device or object, or may be, or may be mounted on, an object as described above. In various implementations, the example image processing system 1200 may have an imaging device 1202 to form or receive captured image data. This can be implemented in various ways. Thus, in one form, the image processing system 1200 may be one or more digital cameras or other image capture devices, and imaging device 1202, in this case, may be the camera hardware and camera sensor software, module, or component. In other examples, imaging processing system 1200 may have an imaging device 1202 that includes or may be one or more cameras, and logic modules 1204 may communicate remotely with, or otherwise may be communicatively coupled to, the imaging device 1202 for further processing of the image data.

Thus, image processing system 1200 may be a single camera alone or on a multi-camera device either of which may be a smartphone, tablet, laptop, or other mobile device. Otherwise, system 1200 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, such as a video camera, camera that provides a preview screen, an HMD that provides a view screen, or some combination of these. Thus, in one form, imaging device 1202 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1202 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor also may support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1202 may be provided with an eye tracking camera.

The system 1200 also may have inertial momentum units (IMUs) or other sensors 1268 such as a gyroscope, digital compass (magnetometer), accelerometer, global position system (GPS), and so forth. These sensors provide data indicating a global orientation of the object or device, as described above.

In the illustrated example and relevant here, the logic modules 1204 may include a raw image handling unit 1206 that performs pre-processing on the image data sufficient for segmentation but also may be sufficient for generating a depth map or depth image, a depth map generation unit 1208 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene).

The logic modules 1204 also may have an object detection unit 1210 and an object control unit 1212 to perform many of the operations already described herein. Thus, for example, the object detection unit 1210 may have an ROI unit 1214 to generate images of identified and annotated ROIs. The object detection unit 1210 also may have a ROI classifier unit 1216 that operates a machine learning classifier as described above, and a machine learning classifier training unit 1218 that trains the classifier as described above. The ROI unit 1214 may have a segmentation unit 1220. It will be understood that the segmentation unit 1220 could be provided alone, or operated separately, for segmentation and without the other object detection unit components to provide segmentation when object detection is not needed. The segmentation unit 1220 may have an object position unit 1222 to perform AoT operations described above. The object position unit 1222 may have an AOT distance unit 1224, distance component unit 1226, object FOV location unit 1228, object scaling unit 1230, and object perspective unit 1232. The segmentation unit 1220 also may have a non-AOT region unit 1234, region merge unit 1236, and a boundary refining unit 1238. The machine learning classifier unit 1218 may have an ROI automatic annotation unit 1240, which could be considered part of other units instead such as the object position unit 1222. The machine learning classifier unit 1218 also may have a weight generation unit 1242. The object control unit 1212 may have an environment detection unit 1244, an object assessment unit 1246, and an object parameter setting unit 1248 to operate the associated functions as described above.

The image processing system 1200 may have one or more processors 1250 which may include a dedicated image signal processor (ISP) 1252 to manage the processing of the frames of the video sequence. The image processing system 1200 also may have memory stores 1254 to store the segmentation, object detection, and other data, including metadata received from the objects as mentioned above. One or more displays 1258 may be provided to provide images 1260, a coder 1262, a wireless network unit 1264 to provide wireless network communication such as BT transmissions as described above, and at least one antenna 1266 to receive or transmit or transceive data. In one example implementation, the image processing system 1200 may have the display 1258, at least one processor 1250 communicatively coupled to the display, and at least one memory 1254 communicatively coupled to the processor, and the wireless network unit 1264. The coder 1262 may be an encoder, decoder, or both. As an encoder 1262, and with antenna 1266, the encoder may be provided to compress image data for transmission to other devices that may display or store the image. It will be understood that as a decoder, the coder may receive and decode image data for processing by the system 1200 to receive images for segmentation in addition to, or instead of, initially capturing the images with the device 1200. Otherwise, the processed image 1260 may be displayed on display 1258 or stored in memory 1254. As illustrated, any of these components may be capable of communication with one another and/or communication with portions of logic modules 1204 and/or imaging device 1202. Thus, processors 1250 may be communicatively coupled to both the image device 1202 and the logic modules 1204 for operating those components. By one approach, although image processing system 1200, as shown in FIG. 12, may include one particular set of blocks or actions associated with particular components or modules, these blocks or actions may be associated with different components or modules than the particular component or module illustrated here.

Referring to FIG. 15, a system 1500 may be, or may have, a peer device or object as described above. The system 1500 may include a wireless network unit 1502, such as a BT chip. Alternatively, system 1500 is a BT chip or other wireless network chip. The wireless network unit 1502 may have a receiver, transmitter, or transceiver 1512 to perform the transmissions. Also, system 1500 may have one or more processor(s) 1504 to perform the operations with the data transmitted or received by the wireless network transmissions mentioned above. The system 1500 may have a memory 1506 to store the metadata 1514 and other data used by the system 1500. This may include volatile or non-volatile memories including RAM, ROM, cache, and so forth as mentioned with the memory and storage of system 1200. IMUs and other sensors 1508 also may be provided for the functions mentioned above such as determining the global orientation and position of the object and storing the orientation data in the metadata. A coder 1510 may be provided to encode data to be transmitted by the wireless network unit 1502 and to decode data that is received. A control module 1516 is provided and optionally may have parameter unit 1518 so that the system 1500 can be controlled by another object or local device and transmit parameter data and receive instructions for adjusting the parameters. The control module 1516 additionally or alternatively may have a peers unit 1520 so that the present object, by using system 1500 as a master, can control other objects and communicates application settings with the other objects using the peers unit 1520.

Figure 13:
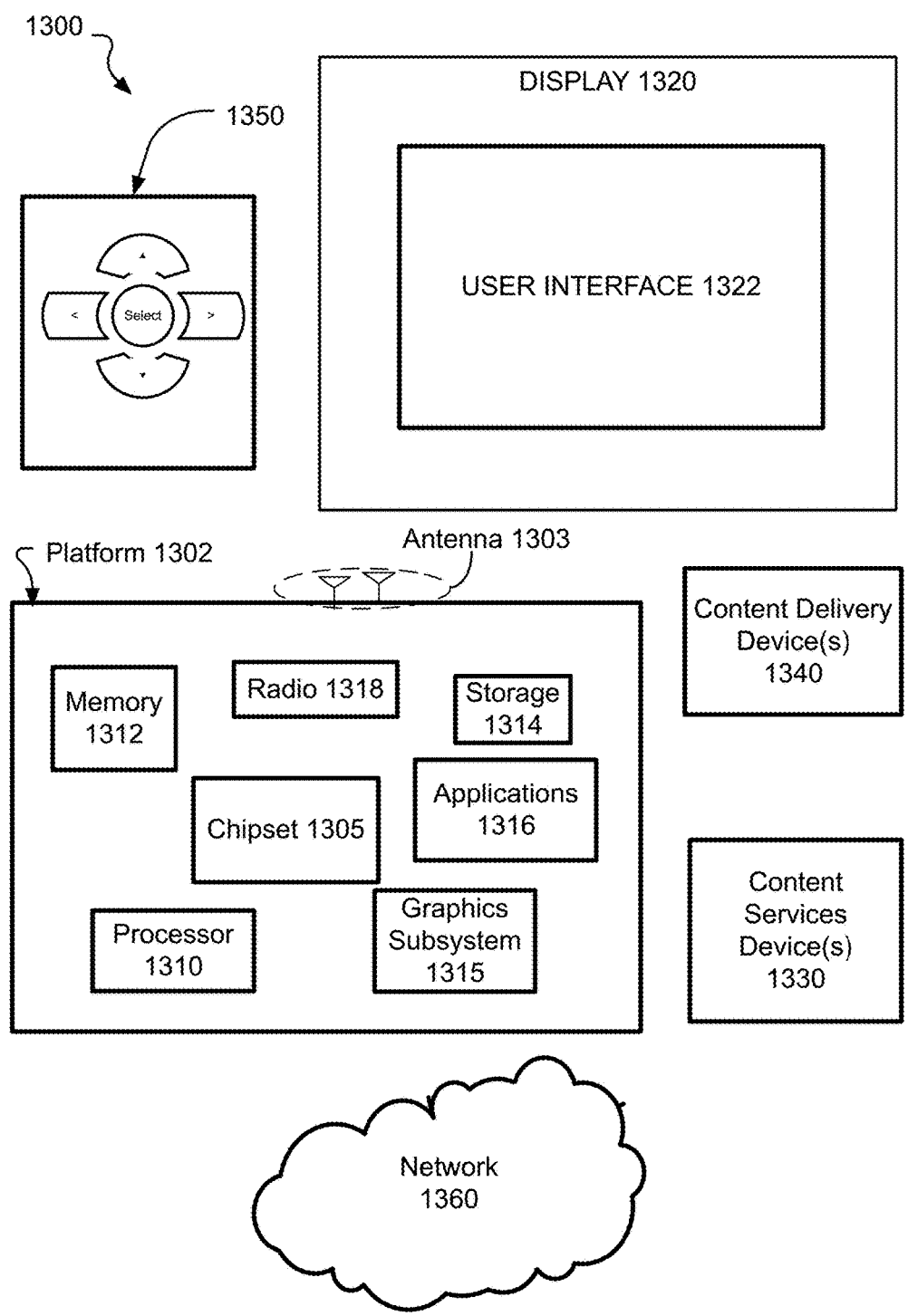
FIG. 13 is an illustrative diagram of another example system.

Referring to FIG. 13, an example system 1300 in accordance with the present disclosure operates one or more aspects of the image processing system described herein. It will be understood from the nature of the system components described below that such components may be associated with, or used to operate, certain part or parts of the image processing system 1000 described above as a local or control device, but could be an object or peer device as well, and therefore, used to operate the methods described herein. In various implementations, system 1300 may be a media system although system 1300 is not limited to this context. For example, system 1300 may be incorporated into a digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/

PDA, television, smart device (e.g., smart phone, smart tablet or smart television), mobile internet device (MID), messaging device, data communication device, and so forth. System 1300 also maybe any object with a wireless network unit, or may be the wireless network unit, as described herein.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1318 may include one or more radios capable of transmitting and receiving signals using various suitable wireless communications techniques. Such techniques may involve communications across one or more wireless networks using wireless network units. By one form, short-wavelength, short-range radio networks, and by one example, a Bluetooth® network with specifications according to Bluetooth 5 for example may be used. Other example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas 1303, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, text ("texting") message, social media formats, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Referring to FIG. 14, a small form factor device 1400 is one example of the varying physical styles or form factors in which system 1200, 1500, and/or 1300 may be embodied. By this approach, device 1400 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 14, device 1400 may include a housing 1402, a display 1404 including a screen 1410, an input/output (I/O) device 1406, and an antenna 1408. Device 1400 also may include navigation features 1412. Display 1404 may include any suitable display unit for displaying information appropriate for a mobile computing device. I/O device 1406 may include any suitable I/O device for entering information into a mobile computing device. Examples for I/O device 1406 may include an alphanumeric keyboard, a numeric keypad, a touch pad, input keys, buttons, switches, rocker switches, microphones, speakers, voice recognition device and software, and so forth. Information also may be entered into device 1400 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, fixed function firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of image processing comprises obtaining image data of at least one image of a video sequence and comprising at least one object region that is a picture of an object and to be segmented from other areas of the at least one image or identified or both; determining a distance along an angle of transmission between a wireless network first unit on an image capture device capturing the at least one image and a wireless network second unit on the object; calculating components of the distance and that are parallel to a plane facing the optical direction of the image capture device; and using the components to determine the position of the object region on the image.

By another implementation, this method may comprise wherein determining the position comprises at least one of: determining a wireless network second unit anchor location in the image and of the object region by using the components, determining the outer dimensions of the object region in the image, determining the orientation of the object region in the image, and all three of these; and wherein the at least one of: dimensions of the object, a location of the wireless network second unit on the object, and an orientation of the object, and all three of these are transmitted from the object to the image capture device. The method comprising: subtracting the at least one object region from the image leaving a non-subtracted part of the image; performing a rough segmentation to the non-subtracted part of the image to detect other object regions in the non-subtracted part of the image; and applying a refining algorithm to finalize the outer boundary of the other object regions if any exist; wherein the distance is determined by using actual transmission Tx power and RSSI received reference power of the transmission forming the distance; wherein the data of the transmission forming the distance being measured is other than the data of the image captured with the at least one object region and on the image capture device; wherein the first and second units are used to determine the distance without using more units and without performing triangulation; wherein a bounding box is defined around the at least one object region; wherein 3D mesh coordinates of the object are obtained from the second unit to form the dimensions of the at least one object and used to position the at least one object region in a field of view of the image capture device; wherein a spectral material map of the at least one object is obtained from the second unit; and wherein the wireless network second unit of the at least one object can provide a position of at least one other object relative to the position of the at least one object, or identification of the at least one other object, or both, and from metadata of other objects stored at the at least one object and obtained from the image capture device or from at least one other object.

The method comprising segmentation of multiple object regions in the at least one image by using the metadata and without determining a distance from the image capture device to at least one object shown in the at least one image having data in the metadata; controlling multiple objects by using the metadata to cooperatively control a real world environment having the multiple objects, wherein the objects are lights, and the method comprising determining a cooperative light effect from the lights; and adjusting an illumination level at at least one of the lights depending on a desired change to the light effect; and substantially continuously detecting objects while the video sequence is being recorded and comprising automatically identifying at least one new object that is encountered for the first time by a machine learning classifier performing the object identification by automatically labeling the at least one new object to train the machine learning classifier to identify the at least one new object; wherein the label of the at least one object is received by transmission from the wireless network second unit at the object.

By other approaches, a computer implemented system of image processing may comprise at least one display; at least one memory to store data related to object regions on at least one image; at least one processor communicatively coupled to the at least one of the memory and display; and at least one object position unit operated by the at least one processor and to operate by: obtaining image data of at least one image of a video sequence and comprising at least one object region that is a picture of an object and to be segmented from other areas of the at least one image or identified or both; determining a distance along an angle of transmission between a wireless network first unit on an image capture device capturing the at least one image and a wireless network second unit on the object; calculating components of the distance and that are parallel to a plane facing the optical direction of the image capture device; and using the components to determine the position of the object region on the image.

By a further approach, the system may include wherein calculating components comprises establishing a cuboid where the distance extends from opposite diagonal corners of the cuboid and the plane is assumed to be one end of the cuboid, and wherein the components are the dimensions of the cuboid; wherein the object position unit is to operate by: receiving a wireless network second unit location on the at least one object relative to the dimensions of the at least one object; and determining an anchor location of the second unit on the object region and in an at least one image; wherein the object position unit is to operate by: receiving dimensions of the at least one object and the orientation of the at least one object in three-dimensional space; determining the orientation of the field of view of the image capture device in three-dimensional space; and moving the at least one object region as shown in at least one image to match a perspective of the field of view. The system comprises a machine learning classifier training unit to operate by receiving at least one object region automatically annotated with a label of the object; wherein the at least one object region is segmented by using the angle of transmission and without analyzing changes in color and intensity; and wherein the at least one object is used in an augmented or modified reality environment.

In yet another example, a computer-readable medium has stored thereon instructions that when executed cause a computing device to operate by: obtaining image data of at least one image of a video sequence and comprising at least one object region that is a picture of an object and to be segmented from other areas of the at least one image or identified or both; determining a distance along an angle of transmission between a wireless network first unit on an image capture device capturing the at least one image and a wireless network second unit on the object; calculating components of the distance and that are parallel to a plane facing the optical direction of the image capture device; and using the components to determine the position of the object region on the image.

By one approach, the computer-readable medium includes instructions to cause the computing device to operate by: determining a wireless network second unit anchor location in the image and of the object region by using the components; determining the outer dimensions of the object region in the image, and determining the orientation of the object region in the image.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image processing comprising:

obtaining image data of at least one image of a video sequence and comprising at least one object region that is a picture of an object and to be segmented from other areas of the at least one image or identified or both;

determining, by a processor, a distance along an angle of transmission between a wireless network first unit on an image capture device capturing the at least one image and a wireless network second unit on the object;

calculating, by a processor, components of the distance, wherein the components are parallel to a plane facing the optical direction of the image capture device; and using, by a processor, the components to determine the position of the object region on the image;

subtracting the at least one object region from the image leaving a non-subtracted part of the image;

performing a rough segmentation to the non-subtracted part of the image to detect other object regions in the non-subtracted part of the image; and applying a refining algorithm to finalize the outer boundary of the other object regions if any exist.

2. The method of claim 1 wherein the distance is determined by using actual transmission Tx power and RSSI received reference power of the transmission forming the distance.

3. The method of claim 1 wherein the data of the transmission forming the distance being measured is other than the data of the image captured with the at least one object region and on the image capture device.

4. The method of claim 1 wherein the first and second units are used to determine the distance without using more units and without performing triangulation.

5. The method of claim 1 wherein a bounding box is defined around the at least one object region.

6. The method of claim 1 wherein 3D mesh coordinates of the object are obtained from the second unit to form the dimensions of the at least one object and used to position the at least one object region in a field of view of the image capture device.

7. The method of claim 1 wherein a spectral material map of the at least one object is obtained from the second unit.

8. The method of claim 1 wherein the angle of transmission is established by a transmission of image data to be displayed on the object.

9. The method of claim 1 wherein determining the position comprises at least one of: determining a wireless network second unit anchor location in the image and of the object region by using the components, determining the outer dimensions of the object region in the image, and determining the orientation of the object region in the image.

10. The method of claim 9 wherein results of determining the position having at least one of: dimensions of the object, a location of the wireless network second unit on the object, and an orientation of the object are transmitted from the object to the image capture device.

11. The method of claim 1 comprising substantially continuously detecting objects while the video sequence is being recorded and comprising automatically identifying at least one new object that is encountered for the first time by a machine learning classifier performing the object identification by automatically labeling the at least one new object to train the machine learning classifier to identify the at least one new object.

12. The method of claim 11 wherein the label of the at least one object is received by transmission from the wireless network second unit at the object.

13. The method of claim 1 wherein the wireless network second unit of the at least one object can provide a position of at least one other object relative to the position of the at least one object, or identification of the at least one other object, or both, and from metadata of other objects stored at the at least one object and obtained from the image capture device or from at least one other object.

14. The method of claim 13 comprising segmentation of multiple object regions in the at least one image by using the metadata and without determining a distance from the image capture device to at least one object shown in the at least one image having data in the metadata.

15. The method of claim 13 comprising controlling multiple objects by using the metadata to cooperatively control a real world environment having the multiple objects.

16. The method of claim 13 wherein the objects are lights, and the method comprising determining a cooperative light effect from the lights; and adjusting an illumination level at at least one of the lights depending on a desired change to the light effect.

17. A computer-implemented system of image processing comprising:
   at least one display;
   at least one memory to store data related to object regions on at least one image;
   at least one processor communicatively coupled to the at least one of the memory and display; and
   at least one object position unit operated by the at least one processor and to operate by:
      obtaining image data of at least one image of a video sequence and comprising at least one object region that is a picture of an object and to be segmented from other areas of the at least one image or identified or both;
      determining a distance along an angle of transmission between a wireless network first unit on an image capture device capturing the at least one image and a wireless network second unit on the object;
      calculating components of the distance wherein the components are parallel to a plane facing the optical direction of the image capture device; and
      using the components to determine the position of the object region on the image;
   wherein the at least one processor operates by segmenting the at least one object region by using the angle of transmission and without analyzing changes in color and intensity.

18. The system of claim 17 wherein calculating components comprises establishing a cuboid where the distance extends from opposite diagonal corners of the cuboid and the plane is assumed to be one end of the cuboid, and wherein the components are the dimensions of the cuboid.

19. The system of claim 17 wherein the object position unit is to operate by:
   receiving a wireless network second unit location on the at least one object relative to the dimensions of the at least one object; and
   determining an anchor location of the second unit on the object region and in an at least one image.

20. The system of claim 17 wherein the object position unit is to operate by:
   receiving dimensions of the at least one object and the orientation of the at least one object in three-dimensional space;
   determining the orientation of the field of view of the image capture device in three-dimensional space; and
   moving the at least one object region as shown in at least one image to match a perspective of the field of view.

21. The system of claim 17 comprising a machine learning classifier training unit to operate by receiving at least one object region automatically annotated with a label of the object.

22. The system of claim 17 wherein the at least one object is used in an augmented or modified reality environment.

23. The system of claim 17 wherein the angle of transmission is established by a transmission of image data to be displayed on the object.

24. A non-transitory computer-readable medium having stored thereon instructions that when executed cause a computing device to operate by:
   obtaining image data of at least one image of a video sequence and comprising at least one object region that is a picture of an object and to be segmented from other areas of the at least one image or identified or both;
   determining a distance along an angle of transmission between a wireless network first unit on an image capture device capturing the at least one image and a wireless network second unit on the object;
   calculating components of the distance, wherein the components are parallel to a plane facing the optical direction of the image capture device; and
   using the components to determine the position of the object region on the image;
   determining a wireless network second unit anchor location in the image and of the object region by using the components;
   determining the outer dimensions of the object region in the image and
   determining the orientation of the object region in the image.

25. The medium of claim 24 wherein the angle of transmission is established by a transmission of image data to be displayed on the object.

* * * * *